US012574910B2

(12) United States Patent
Araujo et al.

(10) Patent No.: US 12,574,910 B2
(45) Date of Patent: Mar. 10, 2026

(54) UE CAPABILITY COORDINATION FOR NE-DC

(71) Applicant: Telefonaktiebolaget LM Ericsson (publ), Stockholm (SE)

(72) Inventors: Lian Araujo, Solna (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 762 days.

(21) Appl. No.: 17/798,927

(22) PCT Filed: Jan. 7, 2021

(86) PCT No.: PCT/SE2021/050005
§ 371 (c)(1),
(2) Date: Aug. 11, 2022

(87) PCT Pub. No.: WO2021/162599
PCT Pub. Date: Aug. 19, 2021

(65) Prior Publication Data
US 2023/0069951 A1 Mar. 9, 2023

Related U.S. Application Data

(60) Provisional application No. 62/976,005, filed on Feb. 13, 2020.

(51) Int. Cl.
*H04W 4/00* (2018.01)
*H04W 72/0453* (2023.01)
(Continued)

(52) U.S. Cl.
CPC ........ *H04W 72/0453* (2013.01); *H04W 76/15* (2018.02); *H04W 92/20* (2013.01)

(58) Field of Classification Search
None
See application file for complete search history.

(56) References Cited

U.S. PATENT DOCUMENTS

2017/0339555 A1* 11/2017 Henttonen ............ H04W 76/15
2019/0281645 A1* 9/2019 Van Der Velde ..... H04W 48/18
(Continued)

FOREIGN PATENT DOCUMENTS

JP 2014502825 A 2/2014
WO 2018083230 A1 5/2018
WO 2019194729 A1 10/2019

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.8.0, Dec. 2019, 1-317.
(Continued)

*Primary Examiner* — Bob A Phunkulh
(74) *Attorney, Agent, or Firm* — Murphy, Bilak & Homiller, PLLC

(57) ABSTRACT

Embodiments described herein relate to methods and apparatuses for signalling band combinations allowed to be used by a second base station. A method performed by a first base station, wherein the first base station is acting as a Master Node in Dual Connectivity, wherein there exists a first band combination list and a second band combination list, and wherein the first band combination list and the second band combination list each contain supported band combinations, comprises: signalling to a second base station to indicate band combinations allowed to be used by the second base station, wherein the second base station is acting as a Secondary Node in Dual Connectivity, wherein the indicated band combinations comprise band combinations from the
(Continued)

Figure 1:
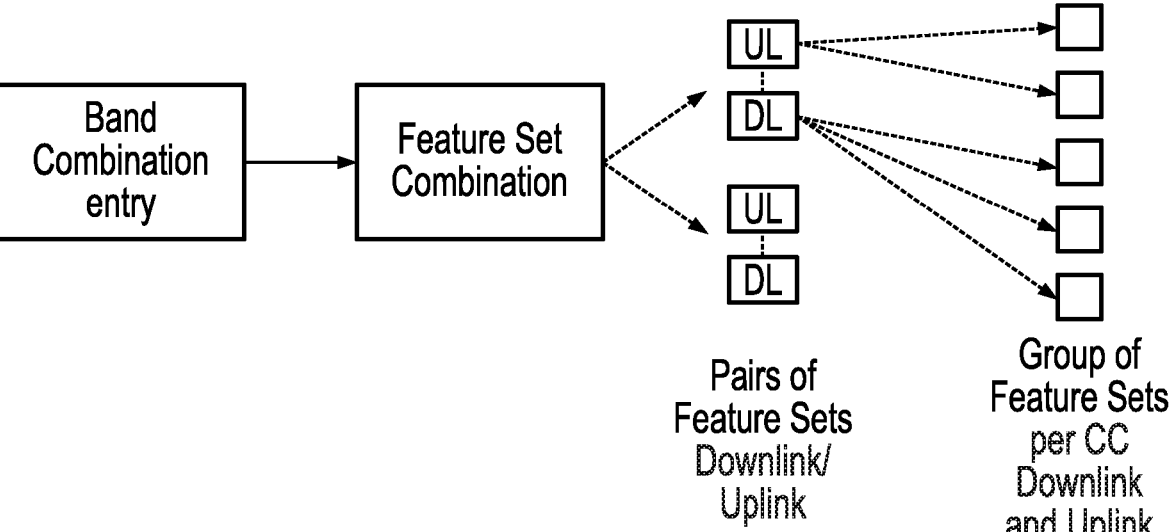

Pairs of
Feature Sets
Downlink/
Uplink

Group of
Feature Sets
per CC
Downlink
and Uplink first band combination list and/or the second band combination list.

32 Claims, 17 Drawing Sheets

(51) Int. Cl.
  *H04W 76/15*      (2018.01)
  *H04W 92/20*      (2009.01)

(56)              References Cited

U.S. PATENT DOCUMENTS

| | | | | |
|---|---|---|---|---|
| 2019/0320396 A1* | 10/2019 | Bagheri | ................ | H04W 52/34 |
| 2019/0342824 A1* | 11/2019 | Futaki | .............. | H04W 36/0077 |
| 2019/0342932 A1* | 11/2019 | Futaki | .................. | H04W 76/16 |
| 2019/0349906 A1* | 11/2019 | Futaki | ............ | H04W 36/00698 |
| 2020/0092879 A1* | 3/2020 | Wu | ........................ | H04W 8/005 |
| 2020/0145888 A1* | 5/2020 | Paladugu | .............. | H04W 80/02 |
| 2020/0260265 A1* | 8/2020 | Jin | .......................... | H04W 8/24 |
| 2020/0367318 A1* | 11/2020 | Takahashi | ............. | H04W 76/15 |
| 2021/0211899 A1* | 7/2021 | Koziol | .................. | H04W 24/10 |
| 2021/0226750 A1* | 7/2021 | Cheng | .................. | H04W 72/23 |
| 2021/0227610 A1* | 7/2021 | Cui | ...................... | H04W 24/10 |
| 2021/0392713 A1* | 12/2021 | Takahashi | ............. | H04W 72/23 |
| 2022/0007308 A1* | 1/2022 | Xiong | .................. | H04W 52/38 |
| 2022/0086625 A1* | 3/2022 | Jin | ....................... | H04W 72/04 |
| 2022/0104052 A1* | 3/2022 | Xu | ....................... | H04B 7/0413 |
| 2022/0110176 A1* | 4/2022 | Aghighi | ................ | H04W 76/16 |
| 2022/0167447 A1* | 5/2022 | Liu | ....................... | H04L 43/065 |
| 2022/0248277 A1* | 8/2022 | Cheng | .................. | H04W 36/08 |
| 2022/0295583 A1* | 9/2022 | Takada | .................. | H04L 5/0037 |
| 2022/0346095 A1* | 10/2022 | Takahashi | ......... | H04W 72/0453 |
| 2022/0346170 A1* | 10/2022 | Takahashi | ............. | H04W 76/16 |

OTHER PUBLICATIONS

3GPP , "3rd Generation Partnership Project; Technical Specification Group Radio Access Network; NR; Base Station (BS) radio transmission and reception (Release 16)", 3GPP TS 38.104 V16.2.0, Dec. 2019, 1-239.

3GPP , "3rd Generation Partnership Project; Technical Specification Group Radio Access Network; NR; Medium Access Control (MAC) protocol specification (Release 15)", 3GPP TS 38.321 V15.8.0, Dec. 2019, 1-78.

3GPP , "3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

Ericsson , "Capability coordination for NE-DC", 3GPP TSG-RAN WG2 #109-e, R2-2001224, Electronic meeting, Feb. 24-Mar. 6, 2020, pp. 1-15.

Mediatek Inc. , "Correction on removal of NR-DC and NE-DC band combinations when capabilityRequestFilterCommon is absent", 3GPP TSG-RAN2 Meeting #109e, R2-2002274, Online, Feb. 24-Mar. 6, 2020, pp. 1-6.

Unknown, Author , "Addition of dynamic power sharing for NE-DC", 3GPP TSG-RAN WG2 #107bis, Tdoc R2-1913520, Chongqing, China, Oct. 14-18, 2019, 1-4.

Unknown, Author , "Returning multiple BC+FS in CG-Config", Ericsson, 3GPP TSG-RAN WG2 #107 Tdoc R2-1910054, Prague, Czech Republic, Aug. 26-30, 2019, 1-16.

Unknown, Author , "TP to TR 37.716.21-21: Addition of DC configurations for DC_2_n41-n71", Ericsson, T-Mobile US, 3GPP TSG-RAN WG4 Meeting #92bis R4-1912600, Chongqing, China,, Oct. 14-Oct. 18, 2019, 1-2.

* cited by examiner

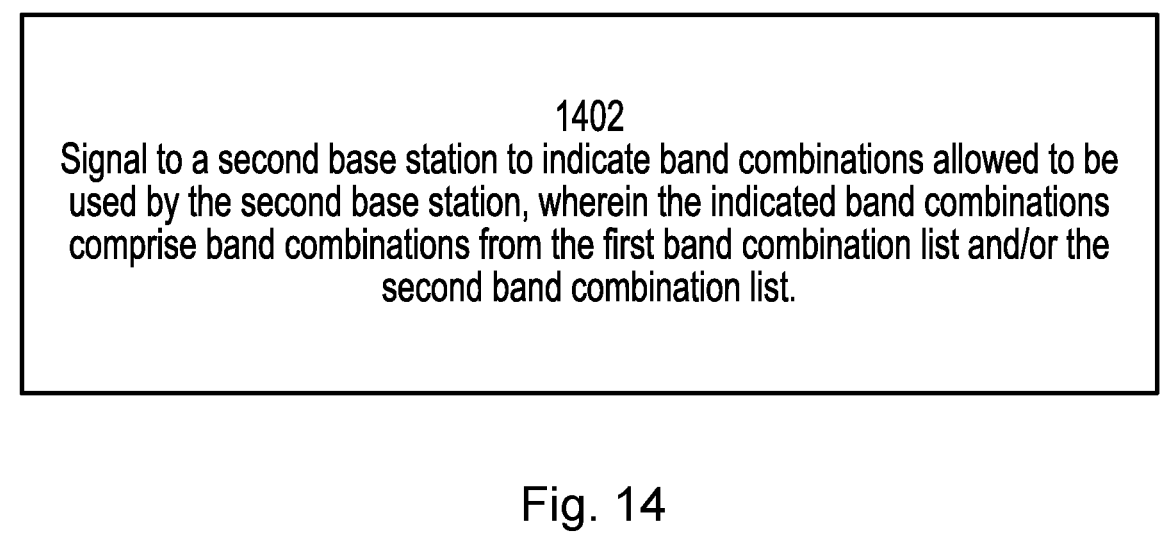

1402
Signal to a second base station to indicate band combinations allowed to be used by the second base station, wherein the indicated band combinations comprise band combinations from the first band combination list and/or the second band combination list.

Fig. 14

1602
Receiving signalling from the first base station to indicate band combinations allowed to be used by the second base station, wherein the indicated band combinations comprise band combinations from the first band combination list and/or the second band combination list

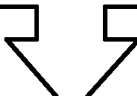

1604
Transmitting a response to the first base station indicating a selected band combination

Fig. 16

UE CAPABILITY COORDINATION FOR NE-DC

TECHNICAL FIELD

Embodiments described herein relate to methods and apparatuses for signalling band combinations to a second base station.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Band Combinations in UE Capability Structure

In New Radio (NR) the user equipment (UE) advertises its capabilities similarly as it was done in Long-Term Evolution (LTE). That is, the UE may not only indicate whether or not it supports a certain feature. Instead, it may indicate that it supports a certain feature when operating on one frequency band (or combinations thereof) but not when operating on another frequency band (or combination thereof). And, also like in LTE, it may indicate that it supports certain features but not necessarily the combination thereof. Also like in LTE, the UE advertises supported band combinations where each band combination indicates the one or more bands that the UE is capable to aggregate (by means of carrier aggregation).

Unlike LTE, the New Radio (NR) signalling for indicating such fine-grained feature support was not directly embedded into the lists in which the UE advertises the supported band combinations. Instead, the NR capability signalling advertises such features in so-called "feature sets" (specifically, FeatureSetDownlink, FeatureSetUplink, FeatureSetDownlinkPerCC, FeatureSetUplinkPerCC). Each of those feature set data structures has a collection of "capability bits" by which the UE may indicate whether it supports the associated features. The UE may advertise many of these feature sets in lists.

In this manner, a list of band combinations is reported by the UE (i.e. a field defined as supportedBandCombinationList, for most of the cases), where each band combination refers to one FeatureSetCombinationId which identifies a Feature Set Combination. This is motivated by the fact that multiple band combinations may have the same Feature Set Combination, and thus can use an identifier (ID) to refer to a sole Feature Set Combination.

In turn, a Feature Set Combination refers to multiple pairs of IDs, the pairs of IDs refer to Feature Set Downlink and Feature Set Uplink. Each Feature Set (Downlink/Uplink) refers to multiple Feature Sets per component carrier (CC) (Downlink/Uplink) (ID).

Therefore, three different levels of IDs are adopted in a band combination entry, with each level representing features that can be reused in other band combinations, by referring to the same ID.

FIG. 1 illustrates a general feature set structure for a band combination entry.

A Feature set combination (FeatureSetCombination IE) can be seen as a matrix of Feature Sets Downlink/Uplink. As an example, for a band combination comprising bands A,B,C, each element represents a pair of (FeatureSetDownlinkId/FeatureSetUplinkId).

Figure 2:
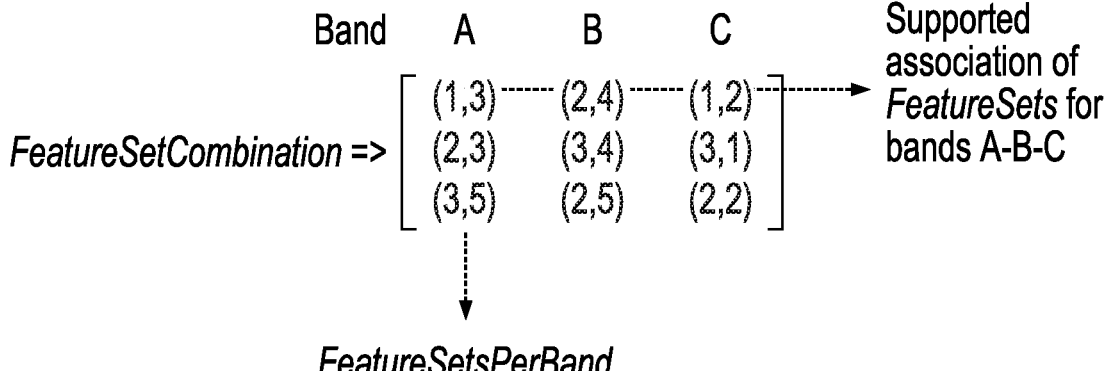

UE supports Feature Sets Downlink/Uplink advertised in the same position across bands in the band combination (in the same row, as illustrated in FIG. 2). FIG. 2 illustrates a feature set combination structure.

Figure 3:
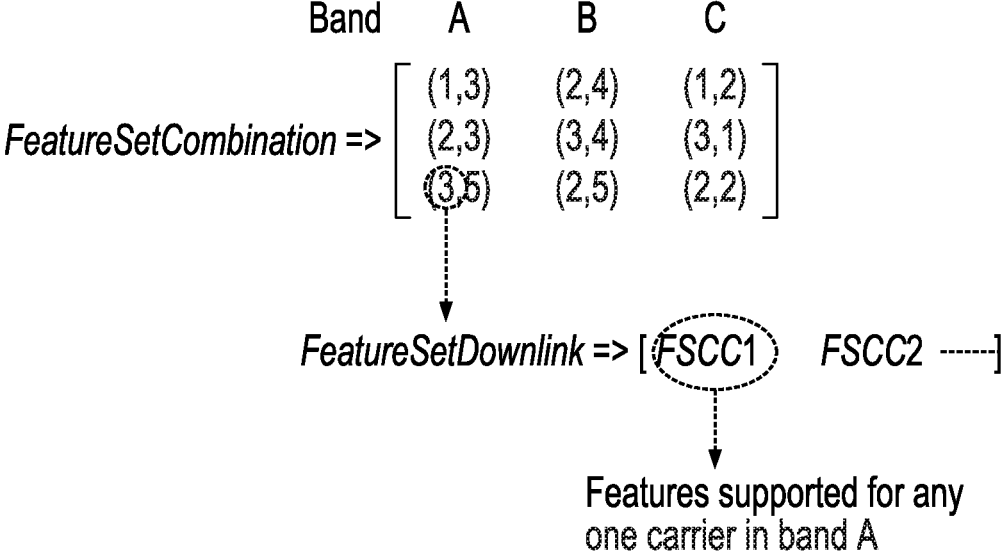

Each FeatureSetDownlinkId points to one FeatureSetDownlink, in turn a FeatureSetDownlink refers to a FeatureSetDowlinkperCC-Id (FSCC in the example illustrated in FIG. 3). The number of FSCC's is equal to the number of carriers supported for that band. Unlike other feature sets, the order of FSCC does not matter. Thus network may configure any of the carriers in accordance with any of the given FSCC's. FIG. 3 illustrates a feature set downlink structure (similar structure is adopted for uplink).

Request for Multi-Radio Dual Connectivity (MR-DC) Capabilities

In Evolved Universal Terrestrial Radio Access (E-UTRA) NR Dual Connectivity (EN-DC), including NGEN-DC, and NR E-UTRA Dual Connectivity (NE-DC), the capabilities of a UE supporting Multi-Radio Dual Connectivity (MR-DC) are carried by different capability containers. Some MR-DC related capabilities are in the MR-DC container e.g. MR-DC band combinations, while other MR-DC related capabilities are contained in the E-UTRA and NR capability containers e.g. feature sets. The MR-DC capabilities in the MR-DC container need to be visible to both the master node (MN) and the secondary node (SN), while the capabilities in the E-UTRA and NR containers only need to be visible to the node of the concerned radio access technology (RAT).

In New Radio Dual Connectivity (NR-DC), all NR-DC related capabilities are in the NR capability container and are visible to both master node (MN) and secondary node (SN).

While reporting UE capabilities for EN-DC, NE-DC and NGEN-DC, those are included in a UE-MRDC-Capability container—namely, the list of band combinations the UE supports for the given MR-DC option (supportedBandCombinationList). The MR-DC capability container (UE-MRDC-Capability) has no FeatureSetDownlink(Uplink) IEs, but refers in its Feature Set Combination to Feature Sets Downlink/Uplink used in NR and E-UTRA capabilities. This implies that consistency should be applied among NR, MR-DC and E-UTRA capabilities concerning Feature Set IDs.

Figure 4:
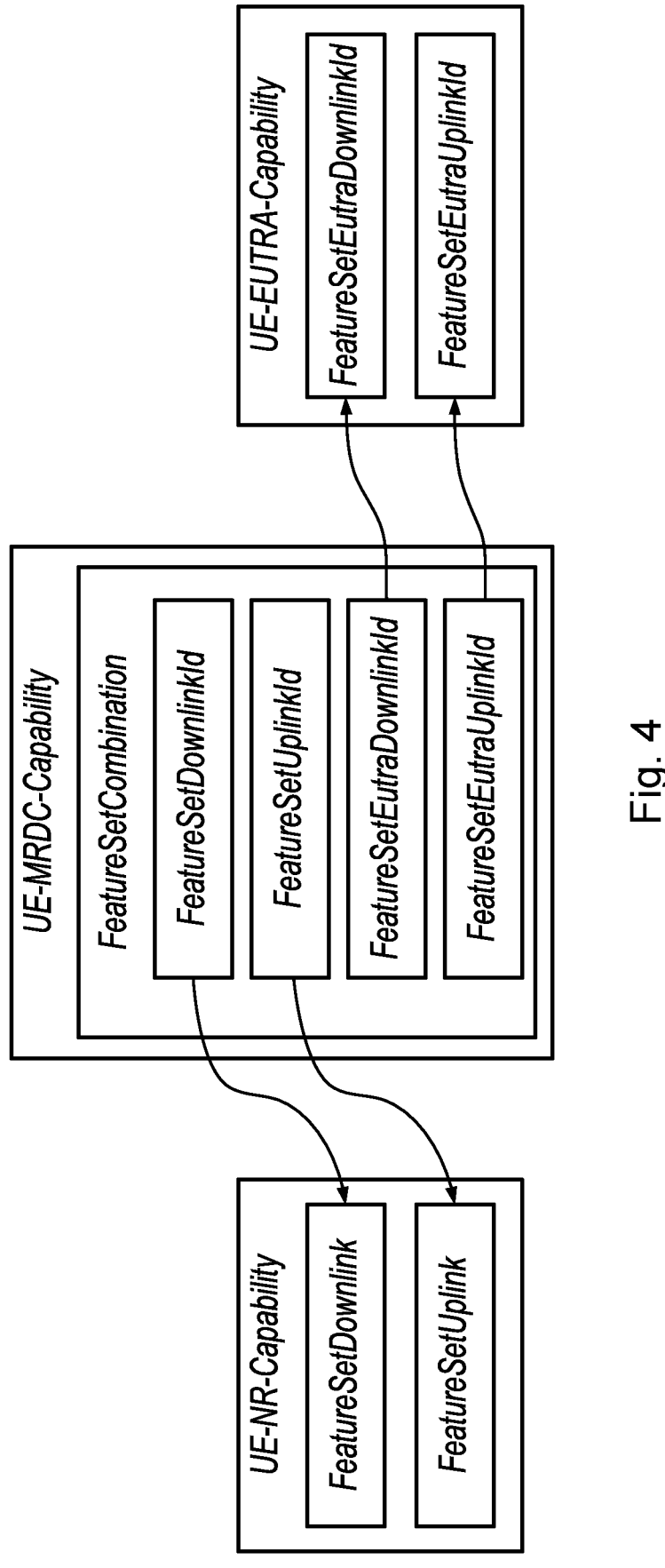

FIG. 4 illustrates feature set dependencies for MR-DC cases.

For NE-DC case, the report of the supported band combinations is performed not only in the field supportedBandCombinationList, but also in the field supportedBandCombinationListNEDC-Only. Basically, if there are band combinations the UE only supports for NE-DC, those are included in the field supportedBandCombinationListNEDC-Only. However, if both NE-DC and EN-DC capabilities were requested and there are band combinations where the capabilities are equally supported for both MR-DC options, those band combinations are included in supportedBand- CombinationList. This is also captured in the field description concerning the request of NE-DC capabilities (include NE-DC) from 38.331 below.

---

UE-CapabilityRequestFilterCommon field descriptions

--- includeNE-DC
Only if this field is present, the UE supporting NE-DC shall indicate support for NE-DC in band combinations and include feature set combinations which are applicable to NE-DC. Band combinations supporting both NE-DC and (NG)EN-DC shall be included in supportedBandCombinationList, band combinations supporting only NE-DC shall be included in supportedBandCombinationListNEDC-Only.

---

The design above was made aiming to reduce signalling in case EN-DC and NE-DC capabilities support the same features for a given band combination. But if there are differences between the supported features for a given band combination, then this band combination would have to be reported separately for NE-DC and EN-DC.

MR-DC Capability Coordination

For the UE capabilities requiring coordination between E-UTRA and NR (i.e. band combinations, baseband processing capabilities and the maximum power for FR1 the UE can use in Secondary Cell Group (SCG)) or between NR MN and NR SN (i.e. band combinations, baseband processing capabilities), it is up to the MN to decide on how to resolve the dependency between MN and SN configurations. The MN then provides the resulting UE capabilities usable for SCG configuration to the SN, including the list of allowed MR-DC band combinations and feature sets, and the SN indicates the selected band combination and feature set to the MN. When subsequently reconfiguring the SCG, the SN should inform the MN whenever the band combination and/or feature set it selected for the SCG changes (i.e. even if the selection concerns a band combination and feature set that is allowed). As part of an SN initiated SN modification, the SN may also indicate the desired UE capabilities usable for SCG configuration (e.g. a band combination and a feature set) outside those allowed by the MN (i.e. it may re-negotiate the UE capabilities for SCG configuration), and it is up to the MN to make the final decision whether to accept or reject the request.

In 38.331, this capability coordination in band combination level is allowed by the field allowedBC-ListMRDC, that contains a list, generated by the MN, of band combinations that can be used by the SN. The field is defined in ASN.1 as below (highlighted in bold).

---

```
ConfigRestrictInfoSCG : :=                    SEQUENCE {
    allowedBC-ListMRDC                        BandCombinationInfoList
OPTIONAL,
    powerCoordination-FR1                       SEQUENCE {
        p-maxNR-FR1                             P-Max
OPTIONAL,
        p-maxEUTRA                              P-Max
OPTIONAL,
        p-maxUE-FR1                             P-Max
OPTIONAL
    }
OPTIONAL,
    servCellIndexRangeSCG                     SEQUENCE {
        lowBound                                ServCellIndex,
        upBound                                 ServCellIndex
    }
OPTIONAL,        -- Cond SN-AddMod
    maxMeasFreqsSCG                             INTEGER(1..maxMeasFreqsMN)
OPTIONAL,
-- TBD Late Drop: If maxMeasIdentitiesSCG is used needs to be decided after RAN4
replies to the LS on measurement requirements for MR-DC.
    maxMeasIdentitiesSCG-NR                     INTEGER(1..maxMeasIdentitiesMN)
OPTIONAL,
    ...,
    [ [
    selectedBandEntriesMNList                  SEQUENCE (SIZE (1..maxBandComb)) OF
SelectedBandEntriesMN        OPTIONAL,
    pdcch-BlindDetectionSCG                     INTEGER (1..15)
OPTIONAL,
    maxNumberROHC-ContextSessionsSN    INTEGER(0.. 16384)
OPTIONAL
    ] ]
}
BandCombinationInfoList : :=                  SEQUENCE (SIZE (1..maxBandComb)) OF
BandCombinationInfo
BandCombinationInfo : :=                       SEQUENCE {
    bandcombinationindex                        BandCombinationIndex,
    allowedFeatureSetsList                      SEQUENCE (SIZE (1..maxFeatureSetsPerBand) ) OF
FeatureSetEntryIndex
}
```

-continued

| CG-ConfigInfo field descriptions |
|---|
| allowedBC-ListMRDC |
| A list of indices referring to band combinations in MR-DC capabilities from which SN is allowed to select the SCG band combination. Each entry refers to a band combination numbered according to supportedBandCombinationList in the UE-MRDC-Capability (in case of (NG)EN-DC or NE-DC) or UE-NR-Capability (in case of NR-DC) and the Feature Sets allowed for each band entry. All MR-DC band combinations indicated by this field comprise the MCG band combination, which is a superset of the MCG band(s) selected by MN. |

| BandCombinationInfo field descriptions |
|---|
| allowedFeatureSetsList |
| Defines a subset of the entries in a FeatureSetCombination. Each index identifies a position in the FeatureSetCombination, which corresponds to one FeatureSetUplink/Downlink for each band entry in the associated band combination.<br>bandCombinationIndex |
| The position of a band combination in the supportedBandCombinationList |

The SN, after receiving the allowed band combinations from the MN, either selects one of those band combinations (and informs this to the MN), or requests a band combination outside the allowed ones from the MN.

```
CG-Config-IEs : :=                          SEQUENCE {
    scg-CellGroupConfig                         OCTET STRING (CONTAINING RRCReconfiguration)
OPTIONAL,
    scg-RB-Config                               OCTET STRING (CONTAINING RadioBearerConfig)
OPTIONAL,
    configRestrictModReq                        ConfIgRestrictModReqSCG
OPTIONAL,
    drx-InfoSCG                                 DRX-Info
OPTIONAL,
    candidateCellInfoListSN                     OCTET STRING (CONTAINING MeasResultList2NR)
OPTIONAL,
    measConfigSN                                MeasConfigSN
OPTIONAL,
    selectedBandCombination                     BandCombinationInfoSN
OPTIONAL,
    fr-InfoListSCG                              FR-InfoList
OPTIONAL,
    candidateServingFreqListNR                  CandidateServingFreqListNR
OPTIONAL,
    nonCriticalExtension                        CG-Config-v1540-IEs
OPTIONAL
}
Conf igRestrictModReqSCG : :=                SEQUENCE {
    requestedBC-MRDC                            BandCombinationInfoSN
OPTIONAL,
    requestedP-MaxFR1                           P-Max
OPTIONAL,
    ...,
    [ [
    requestedPDCCH-BlindDetectionSCG    INTEGER (1..15)
OPTIONAL,
    requestedP-MaxEUTRA                         P-Max
OPTIONAL
    ] ]
}
```

| CG-Config field descriptions |
|---|
| requestedBC-MRDC |
| Used to request confiquring an NR band combination and corresponding feature sets which are forbidden to use by MN (i.e. outside of the allowedBC-ListMRDC) to allow re-negotiation of the UE capabilities for SCG confiquration.<br>requestedPDCCH-BlindDetectionSCG |
| Requested value of the reference number of cells for PDCCH blind detection allowed to be configured for the SCG.<br>requestedP-MaxEUTRA |
| Requested value for the maximum power for the serving cells the UE can use in E-UTRA SCG. This field is only used in NE-DC. |

-continued

| requestedP-MaxFR1 |
| --- |

Requested value for the maximum power for the serving cells on frequency range 1 (FR1) in this
secondary cell group (see TS 38.104 [12]) the UE can use in NR SCG.

scg-CellGroupConfig

Contains the RRCReconfiguration message (containing only secondaryCellGroup and/or
measConfig):
    to be sent to the UE, used upon SCG establishment or modification, as generated (entirely)
    by the (target) SgNB. In this case, the SN sets the RRCReconfiguration message in
    accordance with clause 6 e.g. regarding the "Need" or "Cond" statements.
  or
    including the current SCG configuration of the UE, when provided in response to a query
    from MN, or in SN triggered SN change in order to enable delta signalling by the target SN.
    In this case, the SN sets the RRCReconfiguration message in accordance with clause
    11.2.3.
The field is absent if neither SCG (re)configuration nor SCG configuration query norSN triggered
SN change is performed, e.g. at inter-node capability/configuration coordination which does not
result in SCG (re)configuration towards the UE. This field is not applicable in NE-DC.

scg-CellGroupConfigEUTRA

Includes the E-UTRA RRCConnectionReconfiguration message as specified in TS 36.331 [10]. In
this version of the specification, the E-UTRA RRC message can only include the field scg-
Configuration. Used to (re-)configure the SCG configuration upon SCG establishment or
modification, as generated (entirely) by the (target) SeNB. This field is only used in NE-DC.

scg-RB-Config

Contains the IE RadioBearerConfig:
    to be sent to the UE, used to (re-)configure the SCG RB configuration upon SCG
    establishment or modification, as generated (entirely) by the (target) SgNB or SeNB. In this
    case, the SN sets the RadioBearerConfig in accordance with clause 6, e.g. regarding the
    "Need" or "Cond" statements.
  or
    including the current SCG RB configuration of the UE, when provided in response to a query
    from MN or in SN triggered SN change or bearer type change between SN terminated bearer
    to MN terminated bearer in orderto enable delta signaling by the MN ortarget SN. In this
    case, the SN sets the RadioBearerConfig in accordance with clause 11.2.3.
The field is absent if neitherSCG (re)configuration norSCG configuration query norSN triggered
SN change is performed, e.g. at inter-node capability/configuration coordination which does not
result in SCG RB (re)configuration.

selectedBandCombination

Indicates the band combination selected by SN in (NG)EN-DC, NE-DC, and NR-DC. The SN should
inform the MN with this field whenever the band combination and/or feature set it selected for the
SCG changes (i.e. even if the new selection concerns a band combination and/or feature set that is
allowed by the allowedBC-ListMRDC)

There currently exist certain challenge(s).

Current inter-node messages for MR-DC can coordinate on a sole band combination list within a capability container. Namely, the field supportedBandCombinationList can be coordinated but not the field supportedBandCombinationListNEDC-Only. This implies that the network cannot configure the UE with SCG restrictions in NE-DC according to the band combinations reported in the field supportedBandCombinationListNEDC-Only. Therefore, if the network wants to apply any restriction to SCG configuration, it is limited to configure the UE with SCG in NE-DC according to the band combinations reported in the field supportedBandCombinationList.

In this manner, if the network does not intend to allow, in NE-DC, all possible band combinations reported by the UE to be possible candidates for the SCG configuration, there is no use for the band combinations reported in the field supportedBandCombinationListNEDC-Only (since the network cannot coordinate capabilities based on those band combinations), which may be a significant waste of UE capability signaling. In fact, in cases where all NE-DC band combinations are reported in supportedBandCombinationListNEDC-Only, the network would not be able to configure SCG in NE-DC, in case it would have to add restrictions on SCG configuration based on band combinations. Further-more, since the network needs to find a suitable configuration for both MN and SN among the reported band combinations, to have available only the field supportedBandCombinationList in NE-DC case for coordination may reduce the chances of finding such suitable configuration, leading to failure to configure the SCG in NE-DC.

Those same issues may occur for other cases if multiple band combination lists are used for the reported of UE supported band combinations within a capability container.

SUMMARY

Certain aspects of the present disclosure and their embodiments may provide solutions to these or other challenges.

Mechanisms are proposed for capability coordination in case of multiple lists within a capability container are used to report band combinations. Mainly, the mechanisms should allow an MN and SN to coordinate on capabilities reported in more than one band combination list (e.g. supportedBandCombinationList and supportedBandCombinationListNEDC-Only).

There is thus provided a method to provide capability coordination for MN and SN when multiple band combination lists are reported by the UE in the same UE capability container.

There are, proposed herein, various embodiments which address one or more of the issues disclosed herein.

Certain embodiments may provide one or more of the following technical advantage(s).

With the mechanisms proposed herein, the network can have more options available for the SCG configuration.

Therefore, the mechanisms may increase availability of SCG configuration, currently namely for the NE-DC case and, consequently, produce an increase in UE performance and usage of SCG.

According to some embodiments there is provided a method performed by a first base station, wherein the first base station is acting as a Master Node in Dual Connectivity, wherein there exist a first band combination list and a second band combination list, and wherein the first band combination list and the second band combination list each contain supported band combinations. The method comprises signalling to a second base station to indicate band combinations allowed to be used by the second base station, wherein the second base station is acting as a Secondary Node in Dual Connectivity, wherein the indicated band combinations comprise band combinations from the first band combination list and/or the second band combination list.

According to some embodiments there is provided a method performed by a second base station, wherein a first base station is acting as a Master Node in Dual Connectivity, wherein the second base station is acting as a Secondary Node in Dual Connectivity, wherein there exist a first band combination list and a second band combination list, and wherein the first band combination list and the second band combination list each contain supported band combinations. The method comprises: receiving signalling from the first base station to indicate band combinations allowed to be used by the second base station, wherein the indicated band combinations comprise band combinations from the first band combination list and/or the second band combination list.

According to some embodiments there is provided a first base station acting as a Master Node in Dual Connectivity, wherein a second base station is acting as a Secondary Node in Dual Connectivity, and wherein there exists a first band combination list and a second band combination list, and wherein the first band combination list and the second band combination list each contain supported band combinations. The first base station comprises processing circuitry configured to cause the first base station to: signal to a second base station to indicate band combinations allowed to be used by the second base station, wherein the second base station is acting as a Secondary Node in Dual Connectivity, wherein the indicated band combinations comprise band combinations from the first band combination list and/or the second band combination list.

According to some embodiments there is provided a second base station is acting as a Secondary Node in Dual Connectivity, wherein a first base station is acting as a Master Node in Dual Connectivity, and wherein there exists a first band combination list and a second band combination list, and wherein the first band combination list and the second band combination list each contain supported band combinations. The second base station comprises processing circuitry configured to cause the second base station to: receive signalling from the first base station to indicate band combinations allowed to be used by the second base station, wherein the indicated band combinations comprise band combinations from the first band combination list and/or the second band combination list.

DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The following mechanisms describe how the master node, MN, and the secondary node, SN, can coordinate on capabilities reported in multiple band combination lists within a report. It is focused on the NR E-UTRA Dual Connectivity (NE-DC) case where there may be a band combination list dedicated to NE-DC report (i.e. supportedBandCombinationListNEDC-Only), but the principles described below are applicable to any case where multiple band combination lists are reported.

It should also be noted that the additional mechanisms would not prevent the coordination on a sole band combination list. Therefore, the proposed mechanisms may be combined with current one available for capability coordination.

Two specific mechanisms are described below, as alternative solutions to the problem of how the MN can indicate band combinations that are allowed to be used by the SN. The first mechanism is described below as the use of an Offset index for multiple band combination lists, while the second mechanism is described below as the use of multiple band combination restriction lists.

Offset Index for Multiple Band Combination Lists

The MN can indicate band combinations allowed to be used by the SN:

1) from a first band combination list, by referring to them via a list of indexes, where each index corresponds to the entry position of a band combination in the first band combination list;

2) from a second band combination list, by referring to them via a list of indexes, where each index corresponds to a sum of:

2.1) the entry position of a band combination in the second band combination list;

2.2) the number of entries in the first band combination list.

The SN can, in turn, indicate the selected band combination among the ones allowed by the MN, by the indication methods in 1) or 2). Or the SN can request a band combination outside the ones allowed by the MN, by the indication methods in 1) or 2).

For NE-DC case, this implies that the field allowedBC-ListMRDC would point to band combinations in both supportedBandCombinationList and supportedBandCombinationListNEDC-Only, such that the bandCombinationIndex for combinations in supportedBandCombinationListNEDC-Only would be referred by adding an offset equal to the number of entries in supportedBandCombinationList to the index used in supportedBandCombinationListNE-DC.

An example of how this behaviour can be included in 38.331 is given below, with additions underlined and deleted text in square brackets [ . . . ]:

---

CG-ConfigInfo field descriptions

--- allowedBC-ListMRDC

---

A list of indices referring to band combinations in MR-DC capabilities from which SN is allowed to select the SCG band combination. Each entry refers to:
a band combination numbered according to supportedBandCombinationList in the UE-MRDC-Capability (in case of (NG)EN-DC), or according to supportedBandCombinationList and supportedBandCombinationListNEDC-Only in the UE-MRDC-Capability (in case of NE-DC), or according to UE-NR-Capability (in case of NR-DC);
and the Feature Sets allowed for each band entry.
All MR-DC band combinations indicated by this field comprise the MCG band combination, which is a superset of the MCG band(s) selected by MN.

---

BandCombinationInfo field descriptions

--- allowedFeatureSetsList

---

Defines a subset of the entries in a FeatureSetCombination. Each index identifies a position in the FeatureSetCombination, which corresponds to one FeatureSetUplink/Downlink for each band entry in the associated band combination.
bandCombinationIndex

---

In case of (NG)EN-DC and NR-DC, this field indicates [[The]] the position of a band combination in the supportedBandCombinationList. In case of NE-DC, this field indicates the position of a band combination in the supportedBandCombinationList [[and ]] or supportedBandCombinationListNEDC-Only. Band combination entries in supportedBandCombinationListNEDC-Only are referred by an index which corresponds to the position of a band combination in the supportedBandCombinationListNEDC-Only increased by the number of entries in supportedBandCombinationList

---

CG-Config field descriptions

--- candidateCellInfoListSN

---

Contains information regarding cells that the source secondary node suggests the target secondary gNB to consider configuring.
candidateCellInfoListSN-EUTRA

---

Includes the MeasResultList3EUTRA as specified in TS 36.331 [10]. Contains information regarding cells that the source secondary node suggests the target secondary eNB to consider configuring. This field is only used in NE-DC.
candidateServingFreqListNR, candidateServingFreqListEUTRA

---

Indicates frequencies of candidate serving cells for In-Device Co-existence Indication (see TS 36.331 [10]).
configRestrictModReq

---

Used by SN to request changes to SCG configuration restrictions previously set by MN to ensure UE capabilities are respected. E.g. can be used to request configuring an NR band combination whose use MN has previously forbidden.
drx-ConfigSCG

---

This field contains the complete DRX configuration of the SCG. This field is only used in NR-DC.
drx-InfoSCG

---

This field contains the DRX long and short cycle configuration of the SCG. This field is used in (NG)EN-DC and NE-DC.
fr-InfoListSCG

---

Contains information of FR information of serving cells that include PScell and SCells configured in SCG.
measuredFrequenciesSN

---

Used by SN to indicate a list of frequencies measured by the UE.
needForGaps

---

In NE-DC, indicates whether the SN requests gNB to configure measurements gaps.
ph-InfoSCG

---

Power headroom information in SCG that is needed in the reception of PHR MAC CE of MCG
ph-SupplementaryUplink

---

Power headroom information for supplementary uplink. In the case of (NG)EN-DC and NR-DC, this field is only present when two UL carriers are configured for a serving cell and one UL carrier reports
type1 PH while the other reports type 3 PH.

-continued

--- ph-Type1or3

---

Type of power headroom for a certain serving cell in SCG (PSCell and activated SCells). Value
type1 refers to type 1 power headroom, value type3 refers to type 3 power headroom. (See TS
38.321 [3]).
ph-Uplink

---

Power headroom information for uplink.
pSCellFrequency, pSCellFrequencyEUTRA

---

Indicates the frequency of PSCell in NR (i.e., pSCellFrequency) or E-UTRA (i.e.,
pSCellFrequencyEUTRA). In this version of the specification, pSCellFrequency is not used in NE-
DC whereas pSCellFrequencyEUTRA is only used in NE-DC.
reportCGI-RequestNR, reportCGI-RequestEUTRA

---

Used by SN to indicate to MN about configuring reportCGI procedure. The request may optionally
contain information about the cell for which SN intends to configure reportCGI procedure. In this
version of the specification, the reportCGI-RequestNR is used in (NG)EN-DC and NR-DC whereas
reportCGI-RequestEUTRA is used only for NE-DC.
requestedBC-MRDC

---

Used to request configuring a[[n NR]] band combination from supportedBandCombinationList in the
UE-MRDC-Capability (in case of (NG)EN-DC or NE-DC) or UE-NR-Capability (in case of NR-DC)
and corresponding feature sets, which are forbidden to use by MN (i.e. outside of the allowedBC-
ListMRDC) to allow re-negotiation of the UE capabilities for SCG configuration. In NE-DC, this
field
may refer to band combinations from supportedBandCombinationList or
supportedBandCombinationListNEDC-Only. Band combination entries in
supportedBandCombinationListNEDC-Only are referred by an index which corresponds to the
position of a band combination in the supportedBandCombinationListNEDC-Only increased by the
number of entries in supportedBandCombinationList.
requestedPDCCH-BlindDetectionSCG

---

Requested value of the reference number of cells for PDCCH blind detection allowed to be
configured for the SCG.
requestedP-MaxEUTRA

---

Requested value for the maximum power for the serving cells the UE can use in E-UTRA SCG. This
field is only used in NE-DC.
requestedP-MaxFR1

---

Requested value for the maximum power for the serving cells on frequency range 1 (FR1) in this
secondary cell group (see TS 38.104 [12]) the UE can use in NR SCG.
scg-CellGroupConfig

---

Contains the RRCReconfiguration message (containing only secondaryCellGroup and/or
measConfigy.
        to be sent to the UE, used upon SCG establishment or modification, as generated (entirely)
        by the (target) SgNB. In this case, the SN sets the RRCReconfiguration message in
        accordance with clause 6 e.g. regarding the "Need" or "Cond" statements.
    or
        including the current SCG configuration of the UE, when provided in response to a query
        from MN, or in SN triggered SN change in order to enable delta signaling by the target SN. In
        this case, the SN sets the RRCReconfiguration message in accordance with clause 11.2.3.
The field is absent if neither SCG (re)configuration nor SCG configuration query norSN triggered
SN change is performed, e.g. at inter-node capability/configuration coordination which does not
result in SCG (re)configuration towards the UE. This field is not applicable in NE-DC.
scg-CellGroupConfigEUTRA

---

Includes the E-UTRA RRCConnectionReconfiguration message as specified in TS 36.331 [10]. In
this version of the specification, the E-UTRA RRC message can only include the field scg-
Configuration. Used to (re-)configure the SCG configuration upon SCG establishment or
modification, as generated (entirely) by the (target) SeNB. This field is only used in NE-DC.
scg-RB-Config

---

Contains the IE RadioBearerConfig:
        to be sent to the UE, used to (re-)configure the SCG RB configuration upon SCG
        establishment or modification, as generated (entirely) by the (target) SgNB or SeNB. In this
        case, the SN sets the RadioBearerConfig in accordance with clause 6, e.g. regarding the
        "Need" or "Cond" statements.

-continued or
    including the current SCG RB configuration of the UE, when provided in response to a query
    from MN or in SN triggered SN change or bearer type change between SN terminated bearer
    to MN terminated bearer in order to enable delta signaling by the MN or target SN. In this
    case, the SN sets the RadioBearerConfig in accordance with clause 11.2.3.
The field is absent if neither SCG (re)configuration nor SCG configuration query nor SN triggered
SN change is performed, e.g. at inter-node capability/configuration coordination which does not
result in SCG RB (re)configuration.
selectedBandCombination Indicates the band combination selected by SN among the band combinations allowed by
allowedBC-ListMRDC, in (NG)EN-DC, NE-DC, and NR-DC. The SN should inform the MN with
this
field whenever the band combination and/or feature set it selected for the SCG changes (i.e. even if
the new selection concerns a band combination and/or feature set that is allowed by the allowedBC-
ListMRDC). In NE-DC, this field may refer to band combinations from
supportedBandCombinationList or supportedBandCombinationListNEDC-Only. Band combination
entries in supportedBandCombinationListNEDC-Only are referred by an index which corresponds to
the position of a band combination in the supportedBandCombinationListNEDC-Only increased by
the number of entries in supportedBandCombinationList.

Since the size of bandCombinationIndex is the size of a sole band combination list, one can consider, in principle, to add a new allowedBC-ListMRDC or extend only for the band combination list dedicated to NE-DC report. While this is a possible solution, the one above is also acceptable considering that it is actually not expected that the size of both band combinations lists reach its limit simultaneously.

Multiple Band Combination Restriction Lists

The MN can indicate band combinations allowed to be used by the SN:

1) from a first band combination list, by referring to them via a first list of indexes, where each index corresponds to the entry position of a band combination in the first band combination list;

2) from a second band combination list, by referring to them via a second list of indexes, where each index corresponds to the entry position of a band combination in the second band combination list;

In this solution, it should be noted that the MN also may have a way to indicate that none of the entries in one of the band combination lists can be used (currently in 38.331, there is only one restriction list defined, and the absence of this list means that all band combination within the referred list can be used). Therefore, additional steps must be defined:

The MN can indicate band combinations not allowed to be used by the SN:

3) by omitting a first list of indexes, where each index corresponds to the entry position of a band combination in a first band combination list;

4) by omitting a second list of indexes, where each index corresponds to the entry position of a band combination in the second band combination list;

In this manner, absence of one of the list of indexes means that the whole band combination referred from that list of indexes cannot be used by the SN for SCG configuration. If there are restrictions to both band combination lists, but there is at least one band combination that can be used in each list, then 1) and 2) above apply.

The SN can, in turn, indicate the selected band combination among the ones allowed by the MN, by the indication methods in 1) or 2) (it must select from either 1) or 2)); or the SN can request a band combination outside the ones allowed by the MN, by the indication methods in 1) or 2). Alternatively, the SN could make indications of selected band combination, or request a new one, using both 1) and 2) in order to give more freedom for the MN to choose a valid configuration.

For NE-DC case, this implies that the field allowedBC-ListMRDC would point to band combinations in supportedBandCombinationList (as already defined in 38.331) and a new field (e.g. allowedBC-ListNEDC) would point to band combinations in supportedBandCombinationListNEDC-Only.

An example of how this behaviour can be included in 38.331 is given below:

CG-Config

This message is used to transfer the SCG radio configuration as generated by the SgNB or SeNB. It can also be used by a CU to request a DU to perform certain actions, e.g. to request the DU to perform a new lower layer configuration.

Direction: Secondary gNB or eNB to master gNB or eNB, alternatively CU to DU.

CG-Config message (possible new text is underlined, and deleted text is shown in square brackets)

```
-- ASN1START
-- TAG-CG-CONFIG-START
CG-Config : :=              SEQUENCE {
    criticalExtensions                  CHOICE {
        c1                                  CHOICE{
            cg-Config                           CG-Config-IEs,
            spare3 NULL, spare2 NULL, spare1 NULL
        },
        criticalExtensionsFuture            SEQUENCE { }
    }
}
CG-Config-IEs : :=                  SEQUENCE {
    scg-CellGroupConfig                 OCTET STRING (CONTAINING RRCReconfiguration)
OPTIONAL,
```

```
    scg-RB-Config                      OCTET STRING (CONTAINING RadioBearerConfig)
OPTIONAL,
    configRestrictModReq               ConfigRestrictModReqSCG
OPTIONAL,
    drx-InfoSCG                        DRX-Info
OPTIONAL,
    candidateCellInfoListSN            OCTET STRING (CONTAINING MeasResultList2NR)
OPTIONAL,
    measConfigSN                       MeasConfigSN
OPTIONAL,
    selectedBandCombinationx           MeasConfigSN
OPTIONAL,
    fr-infoListSCG                     FR-InfoList
OPTIONAL,
    candidateServingFreqListNR         CandidateServingFreqListNR
OPTIONAL,
    nonCriticalExtension               CG-Config-v1540-IEs
OPTIONAL
}
CG-Config-v1540-IEs : :=            SEQUENCE {
    pSCellFrequency                    ARFCN-ValueNR
OPTIONAL,
    reportCGI-RequestNR                SEQUENCE {
        requestedCellInfo                  SEQUENCE {
            ssbFrequency                       ARFCN-ValueNR,
            cellForWhichToReportCGI            PhysCellId
}
OPTIONAL
    }
OPTIONAL,
    ph-InfoSCG                         PH-TypeListSCG
OPTIONAL,
    nonCriticalExtension               CG-Config-v1560-IEs
OPTIONAL
}
CG-Config-v1560-IEs : :=            SEQUENCE {
    pSCellFrequencyEUTRA               ARFCN-ValueEUTRA
OPTIONAL,
    scg-CellGroupConfigEUTRA           OCTET STRING
OPTIONAL,
    candidateCellInf olistSN-EUTRA     OCTET STRING
OPTIONAL,
    candidateServingFreqListEUTRA      CandidateServingFreqListEUTRA
OPTIONAL,
    needForGaps                        ENUMERATED {true}
OPTIONAL,
    drx-ConfigSCG                      DRX-Config
OPTIONAL,
    reportCGI-RequestEUTRA             SEQUENCE {
        requestedCellInfoEUTRA             SEQUENCE {
            eutraFrequency                     ARFCN-ValueEUTRA,
            cellForWhichToReportCGI-EUTRA      EUTRA-PhysCellId
        }
OPTIONAL
    }
OPTIONAL,
    nonCriticalExtension               CG-Config-v1580-IEs [ [SEQUENCE { } ] ]
OPTIONAL
}
CG-Config-v1580-IEs : :=            SEQUENCE {
    selectedBandCombinationNEDC        BandCombinationInfoSN
OPTIONAL,
    nonCriticalExtension               SEQUENCE { }
OPTIONAL
}
PH-TypeListSCG : :=                 SEQUENCE (SIZE (1..maxNrofServingCells)) OF PH-
InfoSCG
PH-InfoSCG ::-                      SEQUENCE {
    servCellIndex                      ServCellIndex,
    ph-Uplink                          PH-UplinkCarrierSCG,
    ph-SupplementaryUplink             PH-UplinkCarrierSCG
OPTIONAL,
    ...
}
PH-UplinkCarrierSCG : :=            SEQUENCE{
    ph-Type1or3                        ENUMERATED {type1, type3},
    ...
}
MeasConfigSN : :=                   SEQUENCE {
```

-continued

```
measuredFrequenciesSN              SEQUENCE (SIZE (1..maxMeasFreqsSN)) OF NR-
Freqinfo OPTIONAL,
    ...
}
NR-Freqinfo : :=                   SEQUENCE {
  measuredFrequency                  ARFCN-ValueNR
OPTIONAL,
    ...
}
ConfigRestrictModReqSCG : :=       SEQUENCE {
  requestedBC-MRDC                   BandCombinationInfoSN
OPTIONAL,
  requestedP-MaxFR1                  P-Max
OPTIONAL,
    ...,
  [ [
  requestedPDCCH-BlindDetectionSCG   INTEGER (1..15)
OPTIONAL,
  requestedP-MaxEUTRA                P-Max
OPTIONAL
  ] ],
  [ [
  requestedBC-NEDC                   BandCombinationInfoSN
OPTIONAL
  ] ]
}
BandCombinationIndex : := INTEGER (1..maxBandComb)
BandCombinationInfoSN : :=          SEQUENCE {
  bandCombinationIndex               BandCombinationIndex,
  requestedFeatureSets               FeatureSetEntryIndex
}
FR-InfoList : := SEQUENCE (SIZE (1..maxNrofServingCells-1) ) OF FR-Info
FR-Info : := SEQUENCE {
  servCellIndex        ServCellIndex,
  fr-Type              ENUMERATED {fr1, fr2}
}
CandidateServingFreqListNR : := SEQUENCE (SIZE (1.. maxmaxFreqIDC-MRDC) ) OF ARFCN-ValueNR
CandidateServingFreqListEUTRA : := SEQUENCE (SIZE (1. . maxFreqIDC-MRDC) ) OF ARFCN-
ValueEUTRA
-- TAG-CG-CONFIG-STOP
-- ASNISTOP
```

CG-Config field descriptions candidateCellInfoListSN

Contains information regarding cells that the source secondary node suggests the target secondary gNB to
consider configuring.
candidateCellInfoListSN-EUTRA Includes the MeasResultList3EUTRA as specified in TS 36.331 [10]. Contains information regarding cells that
the source secondary node suggests the target secondary eNB to consider configuring. This field is only
used in NE-DC.
candidateServingFreqListNR, candidateServingFreqListEUTRA Indicates frequencies of candidate serving cells for In-Device Co-existence Indication (see TS 36.331 [10]).
configRestrictModReq Used by SN to request changes to SCG configuration restrictions previously set by MN to ensure UE
capabilities are respected. E.g. can be used to request configuring an NR band combination whose use MN
has previously forbidden.
drx-ConfigSCG This field contains the complete DRX configuration of the SCG. This field is only used in NR-DC.
drx-InfoSCG This field contains the DRX long and short cycle configuration of the SCG. This field is used in (NG)EN-DC
and NE-DC.
fr-InfoListSCG Contains information of FR information of serving cells that include PScell and SCells configured in SCG.
measuredFrequenciesSN Used by SN to indicate a list of frequencies measured by the UE.
needForGaps In NE-DC, indicates whether the SN requests gNB to configure measurements gaps.

-continued

--- ph-InfoSCG

---

Power headroom information in SCG that is needed in the reception of PHR MAC CE of MCG
ph-SupplementaryUplink

---

Power headroom information for supplementary uplink. In the case of (NG)EN-DC and NR-DC, this field is
only present when two UL carriers are configured for a serving cell and one UL carrier reports type1 PH while
the other reports type 3 PH.
ph-Type1or3

---

Type of power headroom for a certain serving cell in SCG (PSCell and activated SCells). Value type1 refers
to type 1 power headroom, value type3 refers to type 3 power headroom. (See TS 38.321 [3]).
ph-Uplink

---

Power headroom information for uplink.
pSCellFrequency, pSCellFrequencyEUTRA

---

Indicates the frequency of PSCell in NR (i.e., pSCellFrequency) or E-UTRA (i.e., pSCellFrequencyEUTRA).
In this version of the specification, pSCellFrequency is not used in NE-DC whereas pSCellFrequencyEUTRA
is only used in NE-DC.
reportCGI-RequestNR, reportCGI-RequestEUTRA

---

Used by SN to indicate to MN about configuring reportCGI procedure. The request may optionally contain
information about the cell for which SN intends to configure reportCGI procedure. In this version of the
specification, the reportCGI-RequestNR is used in (NG)EN-DC and NR-DC whereas reportCGI-
RequestEUTRA is used only for NE-DC.
requestedBC-MRDC

---

Used to request configuring a[[n NR]] band combination from supportedBandCombinationList in the UE-
MRDC-Capability (in case of (NG)EN-DC or NE-DC) or UE-NR-Capability (in case of NR-DC) and
corresponding feature sets, which are forbidden to use by MN (i.e. outside of the allowedBC-ListMRDC) to
allow re-negotiation of the UE capabilities for SCG configuration. In NE-DC, when this field is included, the
field requestedBC-NEDC is not included.
requestedBC-NEDC

---

Used to request configuring a band combination from supportedBandCombinationListNEDC-Only and
correspondinq feature sets, which are forbidden to use by MN (i.e. outside of the allowedBC-ListNEDC) to
allow re-negotiation of the UE capabilities for SCG configuration. When this field is included, the field
requestedBC-MRDC is not included. This field is only used in NE-DC.
requestedPDCCH-BlindDetectionSCG

---

Requested value of the reference number of cells for PDCCH blind detection allowed to be configured for the
SCG.
requestedP-MaxEUTRA

---

Requested value for the maximum power for the serving cells the UE can use in E-UTRA SCG. This field is
only used in NE-DC.
requestedP-MaxFR1

---

Requested value for the maximum power for the serving cells on frequency range 1 (FR1) in this secondary
cell group (see TS 38.104 [12]) the UE can use in NR SCG.
scg-CellGroupConfig

---

Contains the RRCReconfiguration message (containing only secondaryCellGroup and/or measConfig)-.
        to be sent to the UE, used upon SCG establishment or modification, as generated (entirely) by the
        (target) SgNB. In this case, the SN sets the RRCReconfiguration message in accordance with clause
        6 e.g. regarding the "Need" or"Cond" statements.
    or
        including the current SCG configuration of the UE, when provided in response to a query from MN, or
        in SN triggered SN change in orderto enable delta signalling by the target SN. In this case, the SN
        sets the RRCReconfiguration message in accordance with clause 11.2.3.
The field is absent if neither SCG (re)configuration nor SCG configuration query norSN triggered SN change
is performed, e.g. at inter-node capability/configuration coordination which does not result in SCG
(re)configuration towards the UE. This field is not applicable in NE-DC.
scg-CellGroupConfigEUTRA

---

Includes the E-UTRA RRCConnectionReconfiguration message as specified in TS 36.331 [10]. In this
version of the specification, the E-UTRA RRC message can only include the field scg-Configuration. Used to
(re-)configure the SCG configuration upon SCG establishment or modification, as generated (entirely) by the
(target) SeNB. This field is only used in NE-DC.
scg-RB-Config

---

Contains the IE RadioBearerConfig-.
        to be sent to the UE, used to (re-)configure the SCG RB configuration upon SCG establishment or
        modification, as generated (entirely) by the (target) SgNB or SeNB. In this case, the SN sets the
        RadioBearerConfig in accordance with clause 6, e.g. regarding the "Need" or "Cond" statements.
    or
        including the current SCG RB configuration of the UE, when provided in response to a query from MN
        or in SN triggered SN change or bearer type change between SN terminated bearer to MN terminated bearer in order to enable delta signalling by the MN or target SN. In this case, the SN sets the
    RadioBearerConfig in accordance with clause 11.2.3.
The field is absent if neither SCG (re)configuration nor SCG configuration query nor SN triggered SN change
is performed, e.g. at inter-node capability/configuration coordination which does not result in SCG RB
(re)configuration.
selectedBandCombination Indicates the band combination selected by SN among the band combinations allowed by allowedBC-
ListMRDC, in (NG)EN-DC, NE-DC, and NR-DC. The SN should inform the MN with this field whenever the
band combination and/or feature set it selected for the SCG changes (i.e. even if the new selection concerns
a band combination and/or feature set that is allowed by the allowedBC-ListMRDC). In NE-DC, when this
field is included, the field selectedBandCombinationNEDC is not included.
selectedBandCombinationNEDC Indicates the band combination selected bv SN among the band combinations allowed bv allowedBC-
ListNEDC, in NE-DC. The SN should inform the MN with this field whenever the band combination and/or
feature set it selected for the SCG changes (i.e. even if the new selection concerns a band combination
and/or feature set that is allowed by the allowedBC-ListNEDC). When this field is included, the field
selectedBandCombination is not included. This field is only used in NE-DC.

BandCombinationInfoSN field descriptions bandCombinationIndex

The position of a band combination in the supportedBandCombinationList
requestedFeatureSets The position in the FeatureSetCombination which identifies one FeatureSetUplink/ Downlink for each
band entry in the associated band combination CG-ConfigInfo This message is used by master eNB or gNB to request the SgNB or SeNB to perform certain actions e.g. to establish, modify or release an SCG. The message may include additional information e.g. to assist the SgNB or SeNB to set the SCG configuration. It can also be used by a CU to request a DU to perform certain actions, e.g. to establish, or modify an master cell group (MCG) or secondary cell group (SCG).

Direction: Master eNB or gNB to secondary gNB or eNB, alternatively CU to DU.

CG-ConfigInfo message

```
-- ASN1START
-- TAG-CG-CONFIG-INFO-START
CG-ConfigInfo : :=            SEQUENCE {
        criticalExtensions              CHOICE {
            c1                              CHOICE{
                cg-ConfigInfo                   CG-ConfigInfo-IEs,
                spare3 NULL, spare2 NULL, spare1 NULL
            },
            criticalExtensionsFuture        SEQUENCE { }
        }
}
CG-ConfigInfo-IEs : :=        SEQUENCE {
        ue-CapabilityInfo                               OCTET STRING (CONTAINING UE-CapabilityRAT-
ContainerList)          OPTIONAL,--         Cond SN-AddMod
        candidateCellInfoListMN                         MeasResultList2NR
OPTIONAL,
        candidateCellInfoListSN                         OCTET STRING (CONTAINING MeasResultList2NR)
OPTIONAL,
        measResultCellListSFTD-NR                       MeasResultCellListSFTD-NR
OPTIONAL,
        scgFailureInfo                                  SEQUENCE {
            failureType                                     ENUMERATED { t310-Expiry,
randomAccessProblem,                                            r1c-MaxNumRetx,
synchReconfigFailure-SCG,                                       scg-reconfigFailure,
            measResultSCG                                       srb3-IntegrityFailure} ,
                                                            OCTET STRING (CONTAINING MeasResultSCG-
Failure)
        }
OPTIONAL,
        configRestrictInfo                              ConfigRestrictInfoSCG
OPTIONAL,
        drx-InfoMCG                                     DRX-Info
OPTIONAL,
        measConfigMN                                    MeasConfigMN
OPTIONAL,
```

-continued

```
    sourceConfigSCG                    OCTET STRING (CONTAINING RRCReconfigura-
                                tion)
OPTIONAL,
    scg-RB-Config                      OCTET STRING (CONTAINING RadioBearerConfig)
OPTIONAL,
    mcg-RB-Config                      OCTET STRING (CONTAINING RadioBearerConfig)
OPTIONAL,
    mrdc-AssistanceInfo                MRDC-AssistanceInfo
OPTIONAL,
    nonCriticalExtension               CG-ConfigInfo-vl54 O-IEs
OPTIONAL
}
CG-ConfigInfo-v+1540-IEs : :=    SEQUENCE {
    ph-InfoMCG                         PH-TypeListMCG
OPTIONAL,
    measResuitReportCGI                SEQUENCE {
        ssbFrequency                   ARFCN-ValueNR,
        cellForWhichToReportCGI        PhysCellId,
        cgi-Info                       CGI-InfoNR
    }
OPTIONAL,
    nonCriticalExtension               CG-Configinfo-vl560-IEs
OPTIONAL
}
CG-ConfigInfo-vl560-IEs : := SEQUENCE {
    candidateCellInfoListMN-EUTRA      OCTET STRING
OPTIONAL,
    candidateCellInfoListSN-EUTRA      OCTET STRING
OPTIONAL,
    sourceConfigSCG-EUTRA              OCTET STRING
OPTIONAL,
    scgFailureInfoEUTRA                SEQUENCE {
        failureTypeEUTRA                   ENUMERATED { t313-Expiry,
randomAccessProblem,                         rlc-MaxNumRetx, scg-
ChangeFailure},
        measResultSCG-EUTRA                OCTET STRING
    }
OPTIONAL,
    drx-ConfigMCG                      DRX-Config
OPTIONAL,
    measResuitReportCGI-EUTRA              SEQUENCE {
        eutraFrequency                     ARFCN-ValueEUTRA,
        cellForWhichToReportCGI-EUTRA      EUTRA-PhysCellId,
        cgi-InfoEUTRA                      CGI-InfoEUTRA
    }
OPTIONAL,
    measResultCellListSFTD-EUTRA       MeasResultCellListSFTD-EUTRA
OPTIONAL,
    fr-infoListMCG                     FR-InfoList
OPTIONAL,
    nonCriticalExtension               CG-Configinfo-v1570-IEs
OPTIONAL
}
CG-ConfigInfo-V1570-IEs : :=    SEQUENCE {
    sftdFrequencyList-NR               SFTD-FrequencyList-NR
OPTIONAL,
    sftdFrequencyList-EUTRA            SFTD-FrequencyList-EUTRA
OPTIONAL,
    nonCriticalExtension               SEQUENCE { }
OPTIONAL
}
SFTD-FrequencyList-NR : :=              SEQUENCE (SIZE (1. . maxCellSFTD) ) OFARFCN-
ValueNR
SFTD-FrequencyList-EUTRA : :=           SEQUENCE (SIZE (1.. maxCellSFTD) ) OF ARFCN-
ValueEUTRA
ConfigRestrictInfoSCG : :=        SEQUENCE {
    allowedBC-ListMRDC                BandCombinationInfoList
OPTIONAL,
    powerCoordination-FR1             SEQUENCE {
        p-maxNR-FR1                   P-Max
OPTIONAL,
        p-maxEUTRA                    P-Max
OPTIONAL,
        p-maxUE-FR1                   P-Max
OPTIONAL
    }
OPTIONAL,
    servCellIndexRangeSCG             SEQUENCE {
        lowBound                      ServCellIndex,
        upBound                       ServCellIndex
```

-continued

```
         }
OPTIONAL,        -- Cond SN-AddMod
         maxMeasFreqsSCG                        INTEGER(1..maxMeasFreqsMN)
OPTIONAL,
-- TBD Late Drop: If maxMeasIdentitiesSCG is used needs to be decided after RAN4
replies to the LS on measurement requirements for MR-DC.
         maxMeasIdentitiesSCG-NR                INTEGER(1..maxMeasIdentitiesMN)
OPTIONAL,
         ...,
         [ [
         selectedBandEntriesMNList             SEQUENCE (SIZE (1. .maxBandComb) ) OF
SelectedBandEntriesMNOPTIONAL,
         pdcch-BlindDetectionSCG               INTEGER (1..15)
OPTIONAL,
         maxNumberROHC-ContextSessionsSN       INTEGER(0.. 16384)
OPTIONAL
         ] ],
         [ [
         allowedBC-ListNEDC                    BandCombinationInfoList
OPTIONAL
] ]
}
SelectedBandEntriesMN : :=                     SEQUENCE (SIZE (1..maxSimultaneousBands)) OF
BandEntryIndex
BandEntryIndex                                 INTEGER (0.. maxNrofServingCells)
PH-TypeListMCG : :=                            SEQUENCE (SIZE (1..maxNrofServingCells)) OF PH-
InfoMCG
PH-InfoMCG : :=                                SEQUENCE (
         servCellIndex                                  ServCellIndex,
         ph-Uplink                                      PH-UplinkCarrierMCG,
         ph-SupplementaryUplink                         PH-UplinkCarrierMCG
OPTIONAL,
         ...
}
PH-UplinkCarrierMCG : :=                       SEQUENCE{
         ph-Type1or3                                    ENUMERATED (type1, type3},
         ...
}
BandCombinationInfoList : :=                   SEQUENCE (SIZE (1..maxBandComb)) OF
BandCombinationInfo
BandCombinationInfo : :=                       SEQUENCE {
bandCombinationIndex                                   BandCombinationIndex,
allowedFeatureSetsList                                 SEQUENCE (SIZE (1..maxFeatureSetsPerBand) ) OF
FeatureSetEntryindex
}
FeatureSetEntryIndex : :=                      INTEGER (1.. maxFeatureSetsPerBand)
DRX-Info : :=                                  SEQUENCE {
         drx-LongCycleStartOffset                       CHOICE {
             ms10                                           INTEGER(0..9),
             ms20                                           INTEGER(0..19),
             ms32                                           INTEGER(0..31),
             ms40                                           INTEGER(0..39),
             ms60                                           INTEGER(0..59),
             ms64                                           INTEGER(0..63),
             ms70                                           INTEGER(0..69),
             ms80                                           INTEGER(0. .79) ,
             ms128                                          INTEGER(0..127),
             ms160                                          INTEGER(0..159),
             ms256                                          INTEGER(0..255),
             ms320                                          INTEGER(0..319),
             ms512                                          INTEGER(0..511),
             ms640                                          INTEGER(0..639),
             ms1024                                         INTEGER(0. .1023),
             ms1280                                         INTEGER(0..1279),
             ms2048                                         INTEGER(0..2047),
             ms2560                                         INTEGER(0..2559),
             ms5120                                         INTEGER(0..5119),
             ms10240                                        INTEGER(0..10239)
         },
         shortDRX                              SEQUENCE {
             drx-ShortCycle                        ENUMERATED {
ms10, ms14, ms16, ms20, ms30, ms32,               ms2, ms3, ms4, ms5, ms6, ms7, ms8,
ms256, ms320, ms512, ms640, spare9,               ms35, ms40, ms64, ms80, ms128, ms160
spare4, spare3, spare2, spare1 },                 spare8, spare7, spare6, spare5,
             drx-ShortCycleTimer                   INTEGER (1..16)
         }
OPTIONAL
}
MeasConfigMN : := SEQUENCE {
```

-continued

| measuredFrequenciesMN | SEQUENCE (SIZE (1..maxMeasFreqsMN) ) OF NR- |
| Freqinfo          OPTIONAL, | |
| measGapConfig | SetupRelease { GapConfig } |
| OPTIONAL, | |
| gapPurpose | ENUMERATED {perUE, perFR1} |
| OPTIONAL, | |
| ..., | |
| [[ measGapConfigFR2 | SetupRelease { GapConfig } |
| OPTIONAL | |
| ] ] | |
| } | |

```
MRDC-AssistanceInfo : := SEQUENCE {
    affectedCarrierFreqCombInfoListMRDC        SEQUENCE (SIZE (1..maxNrofCombIDC) ) OF
AffectedCarrierFreqCombInfoMRDC,
    ...
}
AffectedCarrierFreqCombInfoMRDC : := SEQUENCE {
    victimSystemType                VictimSystemType,
    interferenceDirectionMRDC       ENUMERATED (eutra-nr, nr, other, utra-nr-
other, nr-other, spare3, spare2, spare1},
    affectedCarrierFreqCombMRDC     SEQUENCE{
        affectedCarrierFreqCombEUTRA        AffectedCarrierFreqCombEUTRA
OPTIONAL,
        affectedCarrierFreqCombNR           AffectedCarrierFreqCombNR
    }        OPTIONAL
}
VictimSystemType : := SEQUENCE {
    gps                 ENUMERATED{true}            OPTIONAL,
    glonass             ENUMERATED{true}            OPTIONAL,
    bds                 ENUMERATED{true}            OPTIONAL,
    galileo             ENUMERATED{true}            OPTIONAL,
    wlan                ENUMERATED{true}            OPTIONAL,
    bluetooth           ENUMERATED{true}            OPTIONAL
}
AffectedCarrierFreqCombEUTRA : := SEQUENCE (SIZE (1..maxNrofServingCellsEUTRA)) OF
ARFCN-ValueEUTRA
AffectedCarrierFreqCombNR : := SEQUENCE (SIZE (1..maxNrofServingCells)) OF ARFCN-
ValueNR
-- TAG-CG-CONFIG-INFO-STOP
-- ASNISTOP
```

| -CG-ConfigInfo field descriptions |
| --- |

| allowedBC-ListMRDC |
| --- |
| A list of indices referring to band combinations in MR-DC capabilities from which SN is allowed to select the SCG band combination. Each entry refers to a band combination numbered according to supportedBandCombinationList in the UE-MRDC-Capability (in case of (NG)EN-DC or NE-DC) or UE-NR-Capability (in case of NR-DC) and the Feature Sets allowed for each band entry. All MR-DC band combinations indicated by this field comprise the MCG band combination, which is a superset of the MCG band(s) selected by MN. |
| allowedBC-ListNEDC |
| A list of indices referring to band combinations in NE-DC capabilities from which SN is allowed to select the SCG band combination. Each entry refers to a band combination numbered according to supportedBandCombinationListNEDC-Only. All MR-DC band combinations indicated by this field comprise the MCG band combination, which is a superset of the MCG band(s) selected by MN. When allowedBC-ListMRDC is included and this field is not included, the SN is not allowed to select an SCG band combination from supportedBandCombinationListNEDC-Only. When allowedBC-ListMRDC is not included and this field is included, the SN is not allowed to select an SCG band combination from supportedBandCombinationList. This field is only used in NE-DC. |
| candidateCellInfoListMN, candidateCellInfoListSN |
| Contains information regarding cells that the master node or the source node suggests the target gNB or DU to consider configuring.<br>For (NG)EN-DC, including CSI-RS measurement results in candidateCellInfoListMN is not supported in this version of the specification. For NR-DC, including SSB and/or CSI-RS measurement results in candidateCellInfoListMN is supported. |
| candidateCellInfoListMN-EUTRA, candidateCellInfoListSN-EUTRA |
| Includes the MeasResultList3EUTRA as specified in TS 36.331 [10]. Contains information regarding cells that the master node or the source node suggests the target secondary eNB to consider configuring. These fields are only used in NE-DC. |
| configRestrictInfo |
| Includes fields forwhich SgNB is explicitly indicated to observe a configuration restriction. |

-continued

--- drx-ConfigMCG

---

This field contains the complete DRX configuration of the MCG. This field is only used in NR-DC.
drx-InfoMCG

---

This field contains the DRX long and short cycle configuration of the MCG. This field is used in (NG)EN-DC and NE-DC.
fr-InfoListMCG

---

Contains information of FR information of serving cells that include PCell and SCell(s) configured in MCG.
maxMeasFreqsSCG

---

Indicates the maximum number of NR inter-frequency carriers the SN is allowed to configure with PSCell for measurements.
maxMeasidentitiesSCG-NR

---

Indicates the maximum number of allowed measurement identities that the SCG is allowed to configure.
maxNumberROHC-ContextSessionsSN

---

Indicates the maximum number of context sessions allowed to SN terminated bearer, excluding context sessions that leave all headers uncompressed.
measuredFrequenciesMN

---

Used by MN to indicate a list of frequencies measured by the UE.
measGapConfig

---

Indicates the FR1 and per UE measurement gap configuration configured by MN.
measGapConfigFR2

---

Indicates the FR2 measurement gap configuration configured by MN.
mcg-RB-Config

---

Contains all of the fields in the IE RadioBearerConfig used in MCG, used by the SN to support delta configuration to UE, for bearer type change between MN terminated bearer with NR PDCP to SN terminated bearer. It is also used to indicate the PDCP duplication related information for MN terminated split bearer (whether duplication is configured and if so, whether it is initially activated) in SN Addition/Modification procedure. Otherwise, this field is absent.
measResultReportCGI, measResultReportCGI-EUTRA

---

Used by MN to provide SN with CGI-Info for the cell as perSN's request. In this version of the specification, the measResultReportCGI is used for (NG)EN-DC and NR-DC and the measResultReportCGI-EUTRA is used only for NE-DC.
measResultSCG-EUTRA

---

This field includes the MeasResultSCG-FailureMRDC IE as specified in TS 36.331 [10]. This field is only used in NE-DC.
measResultSFTD-EUTRA

---

SFTD measurement results between the PCell and the E-UTRA PScell in NE-DC. This field is only used in NE-DC.
mrdc-AssistanceInfo

---

Contains the IDC assistance information for MR-DC reported by the UE (see TS 36.331 [10]).
p-maxEUTRA

---

Indicates the maximum total transmit power to be used by the UE in the E-UTRA cell group (see TS 36.104 [33]). This field is used in (NG)EN-DC and NE-DC.
p-maxNR-FR1

---

Indicates the maximum total transmit power to be used by the UE in the NR cell group across all serving cells in frequency range 1 (FR1) (see TS 38.104 [12]) the UE can use in NR SCG.
p-maxUE-FR1

---

Indicates the maximum total transmit power to be used by the UE across all serving cells in frequency range 1 (FR1).
pdcch-BlindDetectionSCG

---

Indicates the maximum value of the reference number of cells for PDCCH blind detection allowed to be configured for the SCG.
ph-InfoMCG

---

Power headroom information in MCG that is needed in the reception of PHR MAC CE in SCG.
ph-SupplementaryUplink

---

Power headroom information for supplementary uplink. For UE in (NG)EN-DC, this field is absent.
ph-Type1or3

---

Type of power headroom for a serving cell in MCG (PCell and activated SCells). type1 refers to type 1 power headroom, type3 refers to type 3 power headroom. (See TS 38.321 [3]).

-continued

| ph-Uplink |
| --- |

Power headroom information for uplink.

| powerCoordination-FR1 |
| --- |

Indicates the maximum power that the UE can use in FR1.

| scgFailureInfo |
| --- |

Contains SCG failure type and measurement results. In case the sender has no measurement results available, the sender may include one empty entry (i.e. without any optional fields present) in measResultPerMOList. This field is used in (NG)EN-DC and NR-DC.

| scgFailureInfoEUTRA |
| --- |

Contains SCG failure type and measurement results of the EUTRA secondary cell group. This field is only used in NE-DC.

| scg-RB-Config |
| --- |

Contains all of the fields in the IE RadioBearerConfig used in SCG, used to allow the target SN to use delta configuration to the UE, e.g. during SN change. The field is signalled upon change of SN. Otherwise, the field is absent. This field is also absent when master eNB uses full configuration option.

| selectedBandEntriesMNList |
| --- |

A list of indices referring to the position of a band entry selected by the MN, in each band combination entry in allowedBC-ListMRDC IE. Each band entry in the subset is identified by its position in the bandlist of this BandCombination. This selectedBandEntriesMNList includes the same number of entries, and listed in the same order as in allowedBC-ListMRDC. The SN uses this information to determine which bands out of the NR band combinations in allowedBC-ListMRDC it can configure in SCG. This field is only used in NR-DC.

| servCellIndexRangeSCG |
| --- |

Range of serving cell indices that SN is allowed to configure for SCG serving cells.

| sftdFrequencyList-NR |
| --- |

Includes a list of SSB frequencies. Each entry identifies the SSB frequency of a PSCell, which corresponds to one MeasResultCellSFTD-NR entry in the MeasResultCellListSFTD-NR.

| sftdFrequencyList-EUTRA |
| --- |

Includes a list of E-UTRA frequencies. Each entry identifies the carrier frequency of a PSCell, which corresponds to one MeasResultSFTD-EUTRA entry in the MeasResultCellListSFTD-EUTRA.

| sourceConfigSCG |
| --- |

Includes all of the current SCG configurations used by the target SN to build delta configuration to be sent to UE, e.g. during SN change. The field contains the RRCReconfiguration message, i.e. including secondaryCellGroup and measConfig. The field is signalled upon change of SN, unless MN uses full configuration option. Otherwise, the field is absent.

| sourceConfigSCG-EUTRA |
| --- |

Includes the E-UTRA RRCConnectionReconfiguration message as specified in TS 36.331 [10]. In this version of the specification, the E-UTRA RRC message can only include the field scg-Configuration. In this version of the specification, this field is absent when master gNB uses full configuration option. This field is only used in NE-DC.

| ue-CapabilityInfo |
| --- |

Contains the IE UE-CapabilityRAT-ContainerList supported by the UE (see NOTE 3). A gNB that retrieves MRDC related capability containers ensures that the set of included MRDC containers is consistent w.r.t. the feature set related information.

| BandCombinationInfo field descriptions |
| --- |

| allowedFeatureSetsList |
| --- |

Defines a subset of the entries in a FeatureSetCombination. Each index identifies a position in the FeatureSetCombination, which corresponds to one FeatureSetUplink/Downlink for each band entry in the associated band combination.

| bandcombinationindex |
| --- |

The position of a band combination in the supportedBandCombinationList

| Conditional Presence | Explanation |
| --- | --- |
| SN-AddMod | The field is mandatory present upon SN addition and SN change. It is optionally present upon SN modification and inter-MN handover without SN change. Otherwise, the field is absent. |

Figure 5:
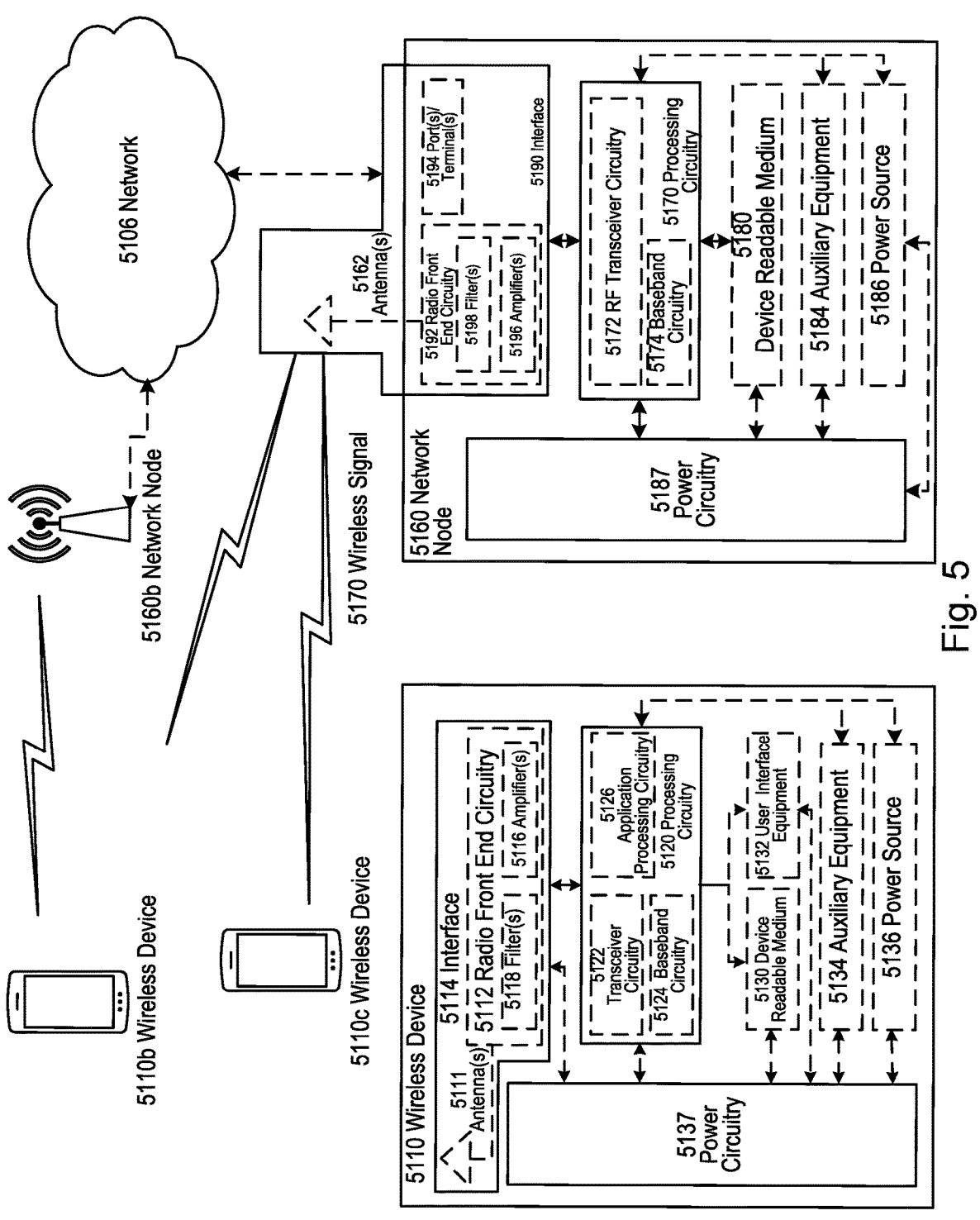

FIG. 5 Illustrates a Wireless Network in Accordance with Some Embodiments.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560*b*, and WDs 510, 510*b*, and 510*c*. In practice, a wireless network may further include any additional elements suitable to support communication between wireless devices or between a wireless device and another communication device, such as a landline telephone, a service provider, or any other network node or end device. Of the illustrated components, network node 560 and wireless device (WD) 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 560 includes processing circuitry 570, device readable medium 580, interface 590, auxiliary equipment 584, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560, but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signalling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 5 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520, and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by WD 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510, and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network, and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Figure 6:
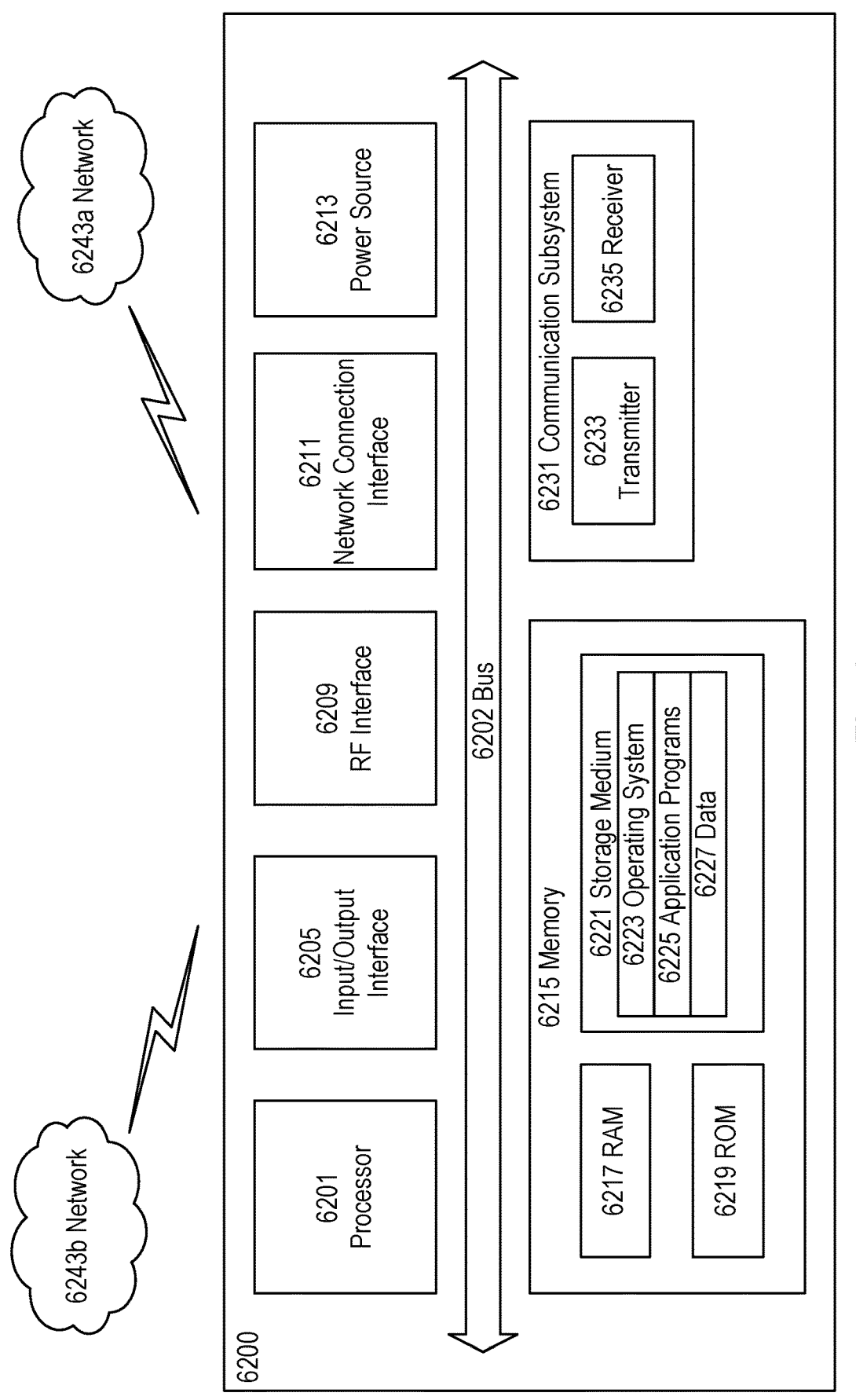

FIG. 6 Illustrates a User Equipment in Accordance with Some Embodiments

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 600 may be any UE identified by the $3^{rd}$ Generation Partnership Project (3GPP), including a NB-IoT UE, a machine type communication (MTC) UE, and/or an enhanced MTC (eMTC) UE. UE 600, as illustrated in FIG. 6, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, UE 600 includes processing circuitry 601 that is operatively coupled to input/output interface 605, radio frequency (RF) interface 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer.

In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 609 may be configured to provide a communication interface to RF components such as a transmitter, a receiver, and an antenna. Network connection interface 611 may be configured to provide a communication interface to network 643a. Network 643a may encompass wired and/or wireless networks such as a local-area network (LAN), a wide-area network (WAN), a computer network, a wireless network, a telecommunications network, another like network or any combination thereof. For example, network 643a may comprise a Wi-Fi network. Network connection interface 611 may be configured to include a receiver and a transmitter interface used to communicate with one or more other devices over a communication network according to one or more communication protocols, such as Ethernet, TCP/IP, SONET, ATM, or the like. Network connection interface 611 may implement receiver and transmitter functionality appropriate to the communication network links (e.g., optical, electrical, and the like). The transmitter and receiver functions may share circuit components, software or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium.

In FIG. 6, processing circuitry 601 may be configured to communicate with network 643b using communication subsystem 631. Network 643a and network 643b may be the same network or networks or different network or networks. Communication subsystem 631 may be configured to include one or more transceivers used to communicate with network 643b. For example, communication subsystem 631 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 631 may include cellular communication, Wi-Fi communication, Bluetooth communication, and GPS communication. Network 643b may encompass wired and/or wireless networks such as a local-area network (LAN), a wide-area network (WAN), a computer network, a wireless network, a telecommunications network, another like network or any combination thereof. For example, network 643b may be a cellular network, a Wi-Fi network, and/or a near-field network. Power source 613 may be configured to provide alternating current (AC) or direct current (DC) power to components of UE 600.

The features, benefits and/or functions described herein may be implemented in one of the components of UE 600 or partitioned across multiple components of UE 600. Further, the features, benefits, and/or functions described herein may be implemented in any combination of hardware, software or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

Figure 7:
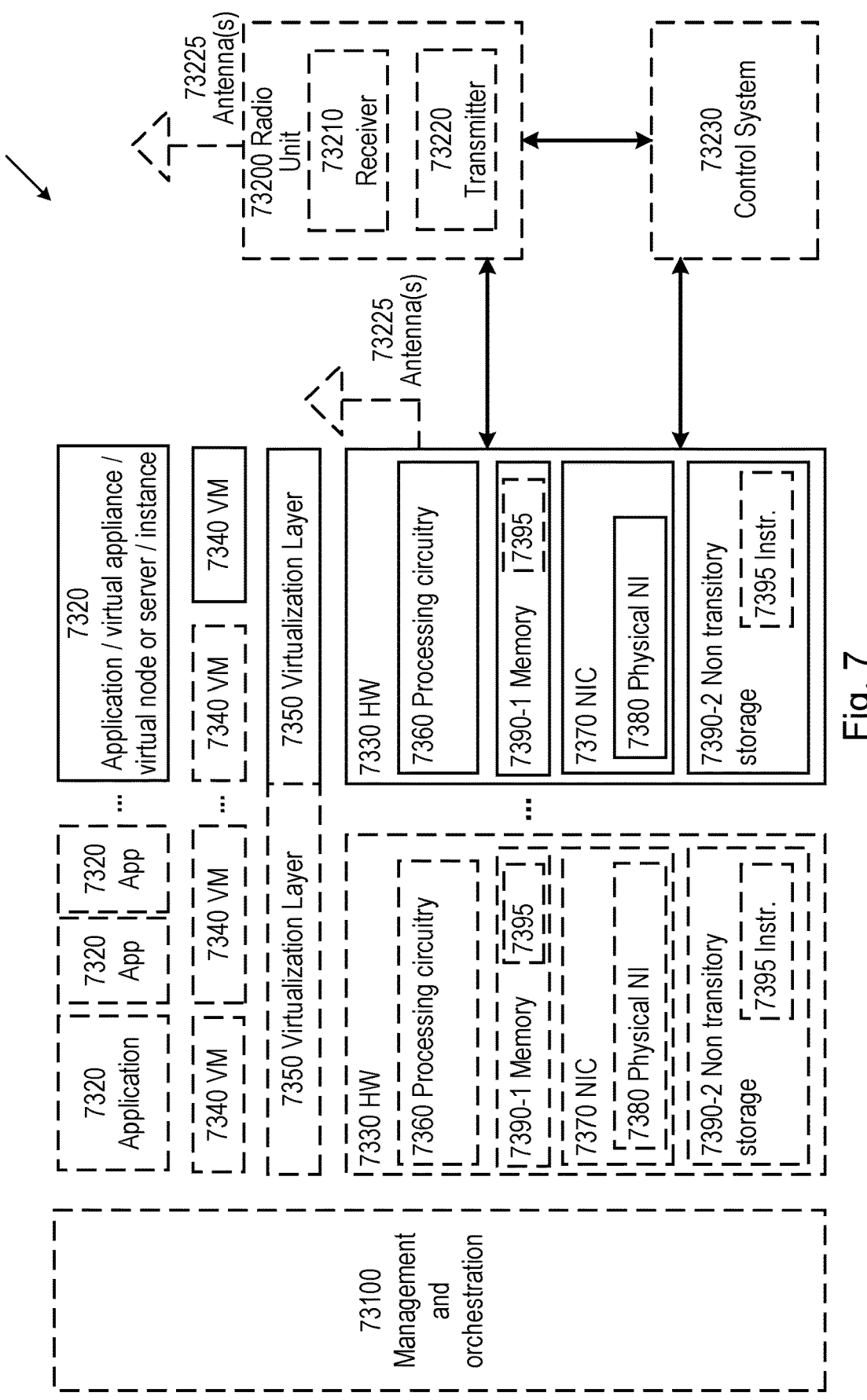

FIG. 7 Illustrates a Virtualization Environment in Accordance with Some Embodiments FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 7, hardware 730 may be a standalone network node with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV, Virtual Network Function (VNF) is responsible for handling specific network functions that run in one or more virtual machines 740 on top of hardware networking infrastructure 730 and corresponds to application 720 in FIG. 7.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signalling can be effected with the use of control system 7230 which may alternatively be used for communication between the hardware nodes 730 and radio units 7200.

Figure 8:
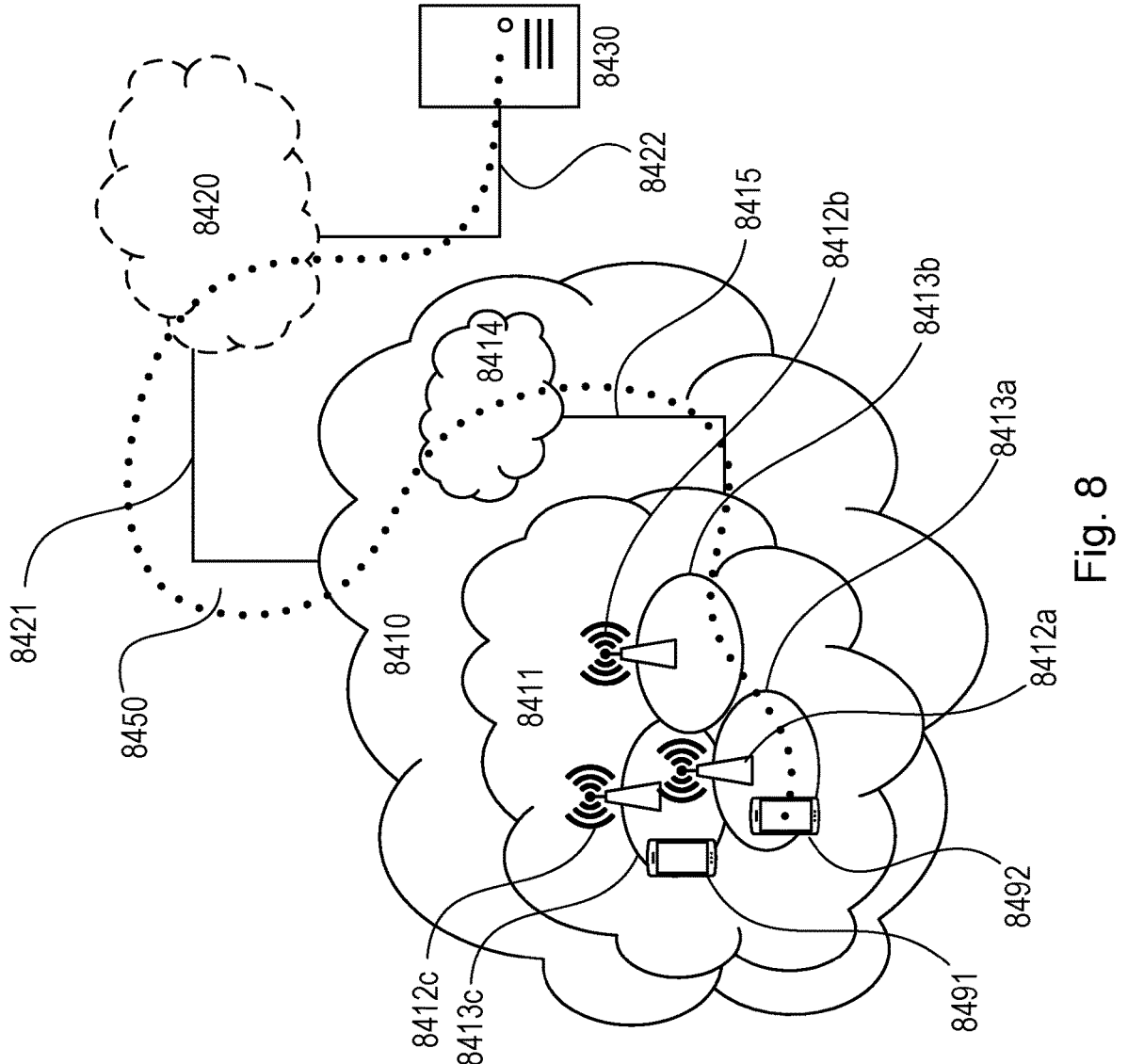

FIG. 8 Illustrates a Telecommunication Network Connected Via an Intermediate Network to a Host Computer in Accordance with Some Embodiments.

With reference to FIG. 8, in accordance with an embodiment, a communication system includes telecommunication network 810, such as a 3GPP-type cellular network, which comprises access network 811, such as a radio access network, and core network 814. Access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more subnetworks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Figure 9:
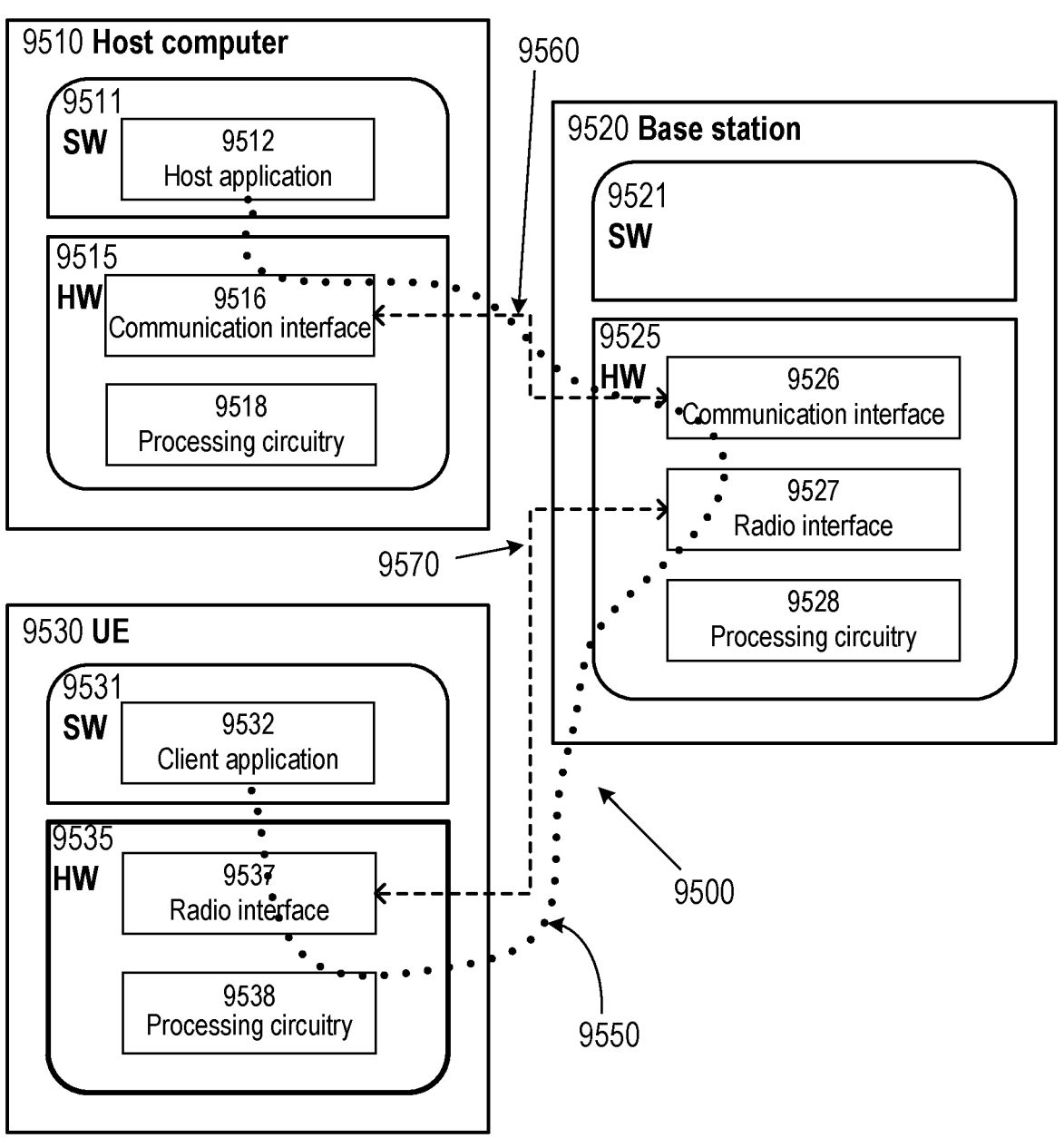

FIG. 9 Illustrates a Host Computer Communicating Via a Base Station with a User Equipment Over a Partially Wireless Connection in Accordance with Some Embodiments.

Example implementations, in accordance with an embodiment, of the UE, base station and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

It is noted that host computer 910, base station 920 and UE 930 illustrated in FIG. 9 may be similar or identical to host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve the data rate, latency, and/or power consumption, and thereby provide benefits such as reduced user waiting time, relaxed restriction on file size, better responsiveness, and extended battery lifetime.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figure 10:
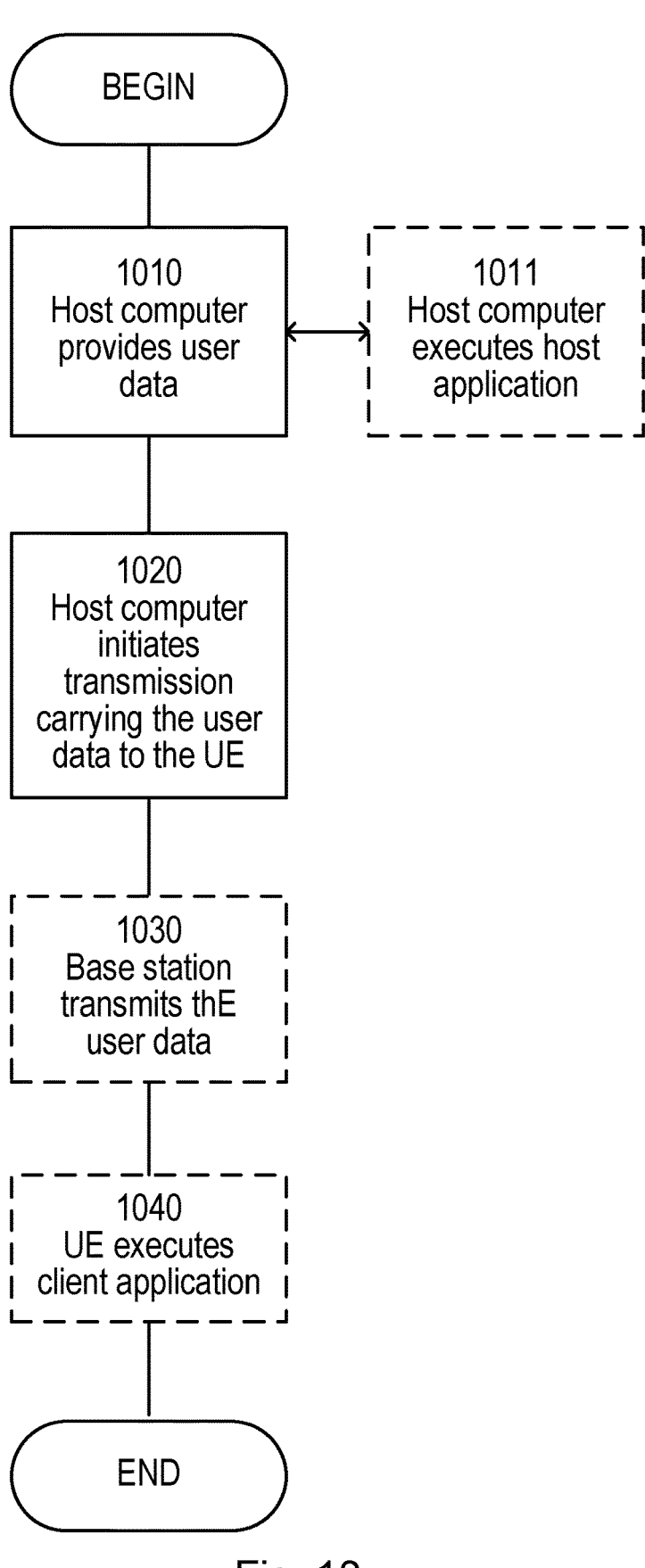

FIG. 10 Illustrates Methods Implemented in a Communication System Including a Host Computer, a Base Station and a User Equipment in Accordance with Some Embodiments FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
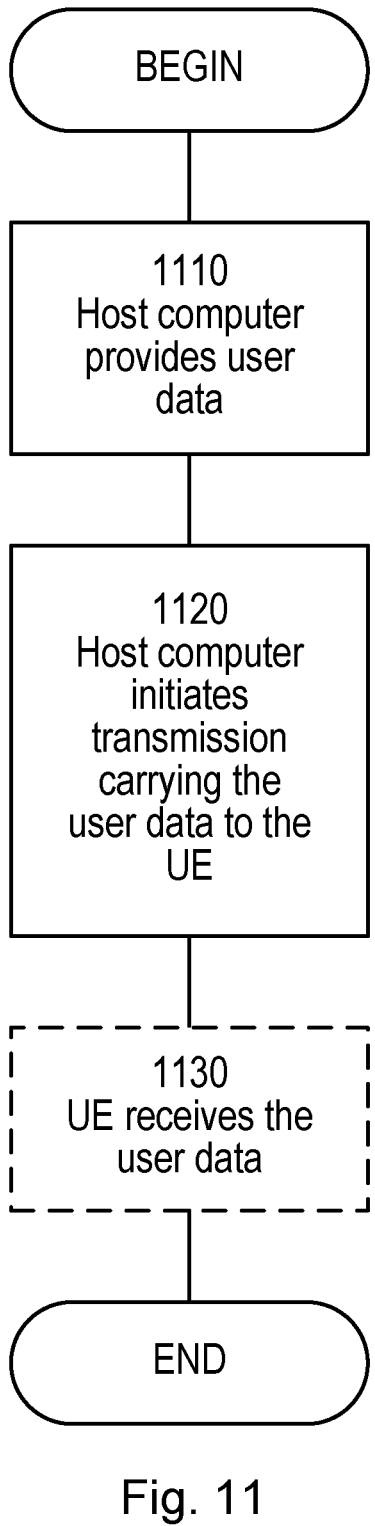

FIG. 11 Illustrates Methods Implemented in a Communication System Including a Host Computer, a Base Station and a User Equipment in Accordance with Some Embodiments FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 12:
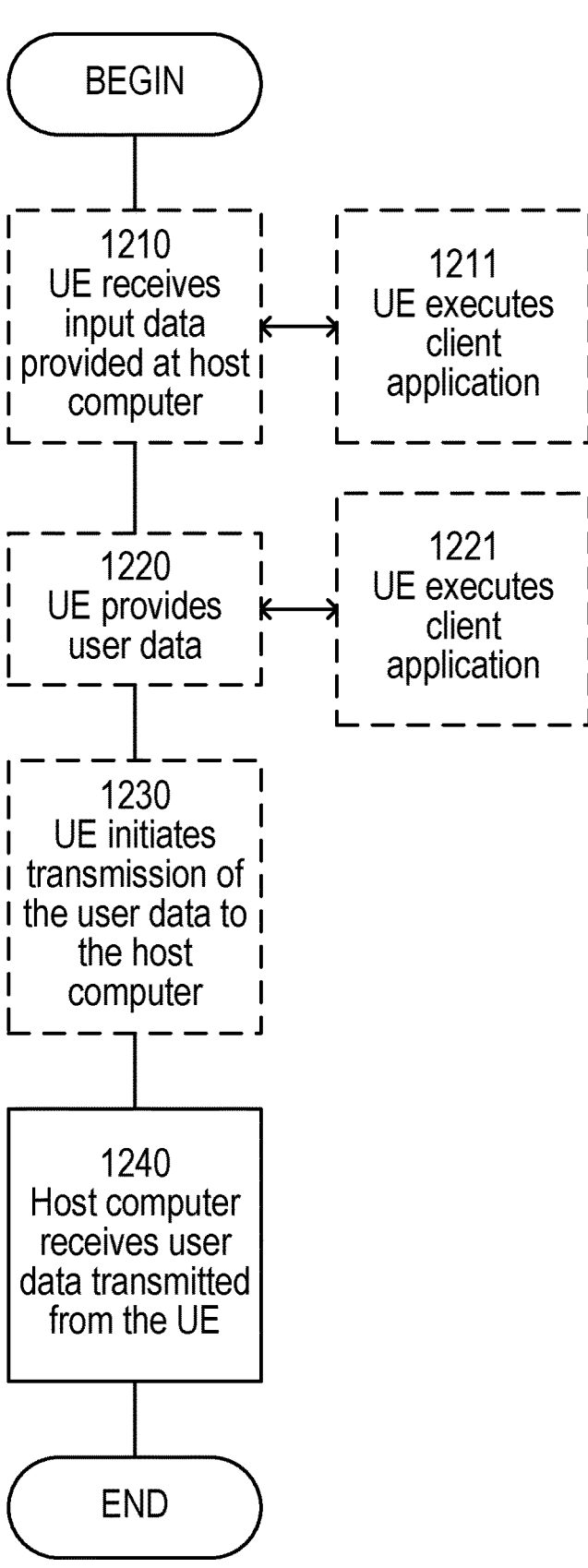

FIG. 12 Illustrates Methods Implemented in a Communication System Including a Host Computer, a Base Station and a User Equipment in Accordance with Some Embodiments FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 13:
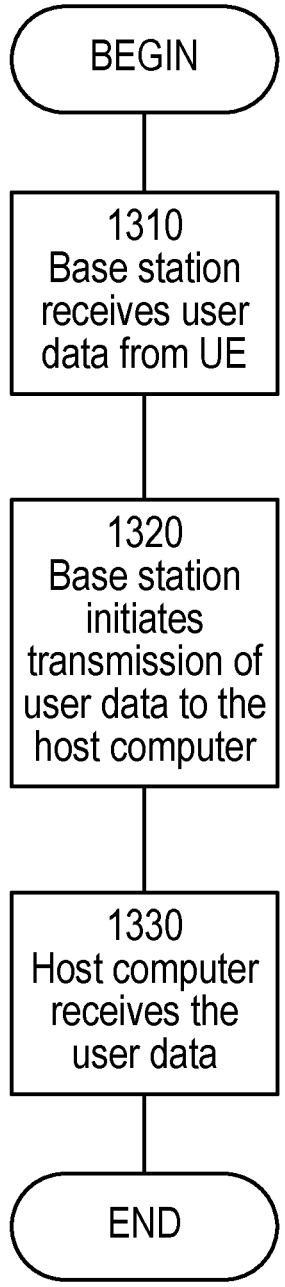

FIG. 13 Illustrates Methods Implemented in a Communication System Including a Host Computer, a Base Station and a User Equipment in Accordance with Some Embodiments FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

FIG. 14 Illustrates a Method in Accordance with Some Embodiments

FIG. 14 depicts a method in accordance with particular embodiments. The method is performed by a first base station, wherein the first base station is acting as a Master Node in Dual Connectivity, and wherein a second base station is acting as a Secondary Node in Dual Connectivity. There exist a first band combination list and a second band combination list, and the first band combination list and the second band combination list each contain supported band combinations. The method comprises step 1402 of signalling to the second base station to indicate band combinations allowed to be used by the second base station, wherein the indicated band combinations comprise band combinations from the first band combination list and/or the second band combination list.

Figure 15:
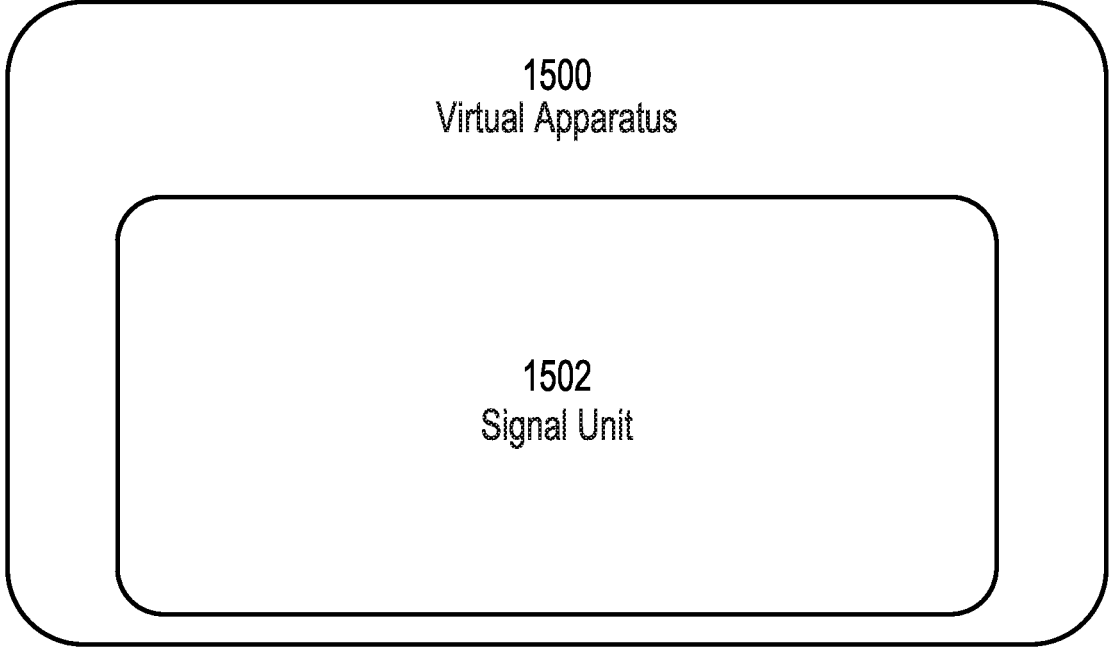

FIG. 15 Illustrates a Virtualization Apparatus in Accordance with Some Embodiments FIG. 15 illustrates a schematic block diagram of an apparatus 1500 in a wireless network (for example, the wireless network shown in FIG. 5). The apparatus may be implemented in a wireless device or network node (e.g., wireless device 510 or network node 560 shown in FIG. 5). Apparatus 1500 is operable to carry out the example method described with reference to FIG. 14 and possibly any other processes or methods disclosed herein. It is also to be understood that the method of FIG. 14 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause signalling unit 1502, and any other suitable units of apparatus 1500, to perform corresponding functions according one or more embodiments of the present disclosure.

As illustrated in FIG. 15, apparatus 1500 may be in the form of a first base station, wherein the first base station is acting as a Master Node in Dual Connectivity, and wherein a second base station is acting as a Secondary Node in Dual Connectivity. There exist a first band combination list and a second band combination list, and the first band combination list and the second band combination list each contain supported band combinations. The apparatus 1500 comprises signalling unit 1502, configured for signalling to the second base station to indicate band combinations allowed to be used by the second base station, wherein the indicated band combinations comprise band combinations from the first band combination list and/or the second band combination list.

FIG. 16 Illustrates a Method in Accordance with Some Embodiments

FIG. 16 depicts a method in accordance with particular embodiments. The method is performed by a second base station, wherein a first base station is acting as a Master Node in Dual Connectivity, and wherein the second base station is acting as a Secondary Node in Dual Connectivity. There exist a first band combination list and a second band combination list, and the first band combination list and the second band combination list each contain supported band combinations. The method comprises step 1602 of receiving signalling from the first base station to indicate band combinations allowed to be used by the second base station, wherein the indicated band combinations comprise band combinations from the first band combination list and/or the second band combination list. The method further comprises step 1604 of transmitting a response to the first base station indicating a selected band combination.

Figure 17:
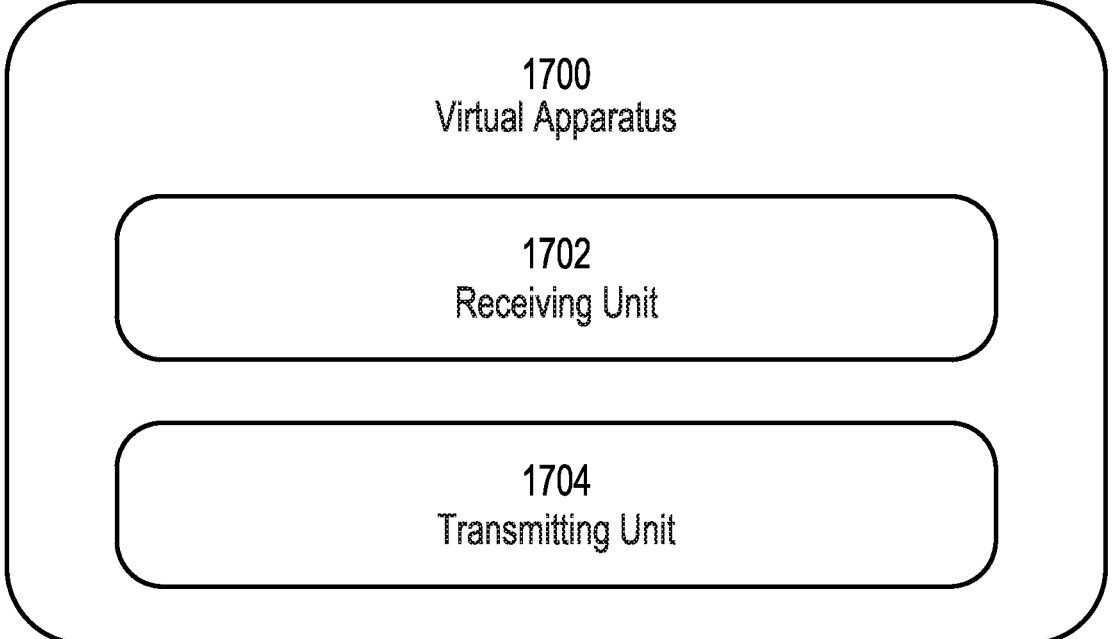

FIG. 17 Illustrates a Virtualization Apparatus in Accordance with Some Embodiments FIG. 17 illustrates a schematic block diagram of an apparatus 1700 in a wireless network (for example, the wireless network shown in FIG. 5). The apparatus may be implemented in a wireless device or network node (e.g., wireless device 510 or network node 560 shown in FIG. 5). Apparatus 1700 is operable to carry out the example method described with reference to FIG. 16 and possibly any other processes or methods disclosed herein. It is also to be understood that the method of FIG. 16 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1702 and transmitting unit 1704, and any other suitable units of apparatus 1700 to perform corresponding functions according one or more embodiments of the present disclosure.

As illustrated in FIG. 17, apparatus 1700 may be in the form of a second base station, wherein a first base station is acting as a Master Node in Dual Connectivity, and wherein the second base station is acting as a Secondary Node in Dual Connectivity. There exist a first band combination list and a second band combination list, and the first band combination list and the second band combination list each contain supported band combinations. The apparatus 1700 comprises a receiving unit 1702, for receiving signalling from the first base station to indicate band combinations allowed to be used by the second base station, wherein the indicated band combinations comprise band combinations from the first band combination list and/or the second band combination list. The apparatus 1700 further comprises transmitting unit 1704, for transmitting a response to the first base station indicating a selected band combination.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Embodiments

Group A Embodiments

1. A method performed by a wireless device, for use in Dual Connectivity, wherein a first base station is to act as a Master Node and a second base station is to act as a Secondary Node, the method comprising:
   informing the first base station of supported band combinations for use in a first band combination list and a second band combination list.

2. The method embodiment 1, wherein the first base station and the second base station are acting in New Radio (NR) Evolved Universal Terrestrial Radio Access (E-UTRA) NR Dual Connectivity (NE-DC).

3. The method of embodiment 2,
   wherein the first band combination list comprises a list of band combinations supported by the wireless device for NE-DC and for E-UTRA NR Dual Connectivity (EN-DC); and
   wherein the second band combination list comprises a list of band combinations supported by the wireless device for NE-DC only.

4. The method of embodiment 2,
   wherein the first band combination list comprises a list of band combinations supported by the wireless device for NE-DC only; and
   wherein the second band combination list comprises a list of band combinations supported by the wireless device for NE-DC and for E-UTRA NR Dual Connectivity (EN-DC).

5. The method of any of the previous embodiments, further comprising:
   providing user data; and
   forwarding the user data to a host computer via the transmission to the base station.

Group B Embodiments

6. A method performed by a first base station, wherein the first base station is acting as a Master Node in Dual Connectivity, wherein there exist a first band combination list and a second band combination list, and wherein the first band combination list and the second band combination list each contain supported band combinations, the method comprising:
   signalling to a second base station to indicate band combinations allowed to be used by the second base station, wherein the second base station is acting as a Secondary Node in Dual Connectivity, wherein the indicated band combinations comprise band combinations from the first band combination list and/or the second band combination list.

7. The method of embodiment 6, wherein the supported band combinations are reported to said base station by a wireless device.

8. The method of embodiment 6 or 7, comprising referring in said signalling to any indicated band combination from the first band combination list by means of an index identifying said indicated band combination within the first band combination list.

9. The method of embodiment 8 wherein said index identifying said indicated band combination within the first band combination list corresponds to a position of said indicated band combination within the first band combination list.

10. The method of embodiment 8 or 9, comprising referring in said signalling to any indicated band combination from the second band combination list by means of an index corresponding to a sum of (a) an index identifying said indicated band combination within the second band combination list, and (b) a number of band combinations in the first band combination list.

11. The method of embodiment 10, wherein said index identifying said indicated band combination within the second band combination list corresponds to a position of said indicated band combination within the second band combination list.

12. The method of one of embodiments 6 to 11, wherein the first base station and the second base station are acting in New Radio (NR) Evolved Universal Terrestrial Radio Access (E-UTRA) NR Dual Connectivity (NE-DC).

13. The method of embodiment 12,
wherein the first band combination list comprises a list of band combinations supported by a wireless device for NE-DC and for E-UTRA NR Dual Connectivity (EN-DC); and
wherein the second band combination list comprises a list of band combinations supported by the wireless device for NE-DC only.

14. The method of embodiment 12,
wherein the first band combination list comprises a list of band combinations supported by a wireless device for NE-DC only; and
wherein the second band combination list comprises a list of band combinations supported by the wireless device for NE-DC and for E-UTRA NR Dual Connectivity (EN-DC).

15. The method of any of embodiments 6 to 14, comprising receiving signalling from the second base station, wherein said received signalling indicates a band combination selected by the second base station from among said indicated band combinations allowed to be used by the second base station.

16. The method of any of embodiments 6 to 14, comprising receiving signalling from the second base station, wherein said received signalling indicates a band combination requested by the second base station that was not among said indicated band combinations allowed to be used by the second base station.

17. The method of embodiment 6 or 7, comprising referring in said signalling to any indicated band combination from the first band combination list by means of an index selected from a first list of indexes, identifying said indicated band combination within the first band combination list, and referring in said signalling to any indicated band combination from the second band combination list by means of an index selected from a second list of indexes, identifying said indicated band combination within the second band combination list.

18. The method of embodiment 17, wherein said index identifying said indicated band combination within the first band combination list corresponds to a position of said indicated band combination within the first band combination list, and wherein said index identifying said indicated band combination within the second band combination list corresponds to a position of said indicated band combination within the second band combination list.

19. The method of embodiment 17 or 18, comprising indicating that no band combination from the first band combination list is allowed to be used by the second base station by omitting the indexes of the first list of indexes from said signalling.

20. The method of embodiment 17, 18 or 19, comprising indicating that no band combination from the second band combination list is allowed to be used by the second base station by omitting the indexes of the second list of indexes in said signalling.

21. The method of one of embodiments 17 to 20, wherein the first base station and the second base station are acting in New Radio (NR) Evolved Universal Terrestrial Radio Access (E-UTRA) NR Dual Connectivity (NE-DC).

22. The method of embodiment 21,
wherein the first band combination list comprises a list of band combinations supported by a wireless device for NE-DC and for E-UTRA NR Dual Connectivity (EN-DC); and
wherein the second band combination list comprises a list of band combinations supported by the wireless device for NE-DC only.

23. The method of embodiment 21,
wherein the first band combination list comprises a list of band combinations supported by a wireless device for NE-DC only; and
wherein the second band combination list comprises a list of band combinations supported by the wireless device for NE-DC and for E-UTRA NR Dual Connectivity (EN-DC).

24. The method of any of embodiments 17 to 23, comprising receiving signalling from the second base station, wherein said received signalling indicates a band combination selected by the second base station from among said indicated band combinations allowed to be used by the second base station.

25. The method of any of embodiments 17 to 23, comprising receiving signalling from the second base station, wherein said received signalling indicates a band combination requested by the second base station that was not among said indicated band combinations allowed to be used by the second base station.

26. A method performed by a second base station, wherein a first base station is acting as a Master Node in Dual Connectivity, wherein the second base station is acting as a Secondary Node in Dual Connectivity, wherein there exist a first band combination list and a second band combination list, and wherein the first band combination list and the second band combination list each contain supported band combinations, the method comprising:

receiving signalling from the first base station to indicate band combinations allowed to be used by the second base station, wherein the indicated band combinations comprise band combinations from the first band combination list and/or the second band combination list.

27. The method of embodiment 26, wherein said signalling refers to any indicated band combination from the first band combination list by means of an index identifying said indicated band combination within the first band combination list.

28. The method of embodiment 27 wherein said index identifying said indicated band combination within the first band combination list corresponds to a position of said indicated band combination within the first band combination list.

29. The method of embodiment 27 or 28, wherein said signalling refers to any indicated band combination from the second band combination list by means of an index corresponding to a sum of (a) an index identifying said indicated band combination within the second band combination list, and (b) a number of band combinations in the first band combination list.

30. The method of embodiment 29, wherein said index identifying said indicated band combination within the second band combination list corresponds to a position of said indicated band combination within the second band combination list.

31. The method of one of embodiments 26 to 30, wherein the first base station and the second base station are acting in New Radio (NR) Evolved Universal Terrestrial Radio Access (E-UTRA) NR Dual Connectivity (NE-DC).

32. The method of embodiment 31,
    wherein the first band combination list comprises a list of band combinations supported by a wireless device for NE-DC and for E-UTRA NR Dual Connectivity (EN-DC); and
    wherein the second band combination list comprises a list of band combinations supported by the wireless device for NE-DC only.

33. The method of embodiment 31,
    wherein the first band combination list comprises a list of band combinations supported by a wireless device for NE-DC only; and
    wherein the second band combination list comprises a list of band combinations supported by the wireless device for NE-DC and for E-UTRA NR Dual Connectivity (EN-DC).

34. The method of any of embodiments 26 to 33, comprising selecting a band combination, and transmitting signalling to the first base station, wherein said signalling indicates the band combination selected by the second base station.

35. The method of embodiment 34, wherein said selected band combination is selected from among said indicated band combinations allowed to be used by the second base station.

36. The method of embodiment 34, wherein said selected band combination was not among said indicated band combinations allowed to be used by the second base station.

37. The method of any of embodiments 34 to 36, wherein said signalling transmitted to the first base station refers to any indicated band combination from the first band combination list by means of an index identifying said indicated band combination within the first band combination list.

38. The method of embodiment 37 wherein said index identifying said indicated band combination within the first band combination list corresponds to a position of said indicated band combination within the first band combination list.

39. The method of any of embodiments 34 to 38, wherein said signalling transmitted to the first base station refers to any indicated band combination from the second band combination list by means of an index corresponding to a sum of (a) an index identifying said indicated band combination within the second band combination list, and (b) a number of band combinations in the first band combination list.

40. The method of embodiment 39, wherein said index identifying said indicated band combination within the second band combination list corresponds to a position of said indicated band combination within the second band combination list.

41. The method of embodiment 26, wherein said signalling refers to any indicated band combination from the first band combination list by means of an index selected from a first list of indexes, identifying said indicated band combination within the first band combination list, and refers to any indicated band combination from the second band combination list by means of an index selected from a second list of indexes, identifying said indicated band combination within the second band combination list.

42. The method of embodiment 41, wherein said index identifying said indicated band combination within the first band combination list corresponds to a position of said indicated band combination within the first band combination list, and wherein said index identifying said indicated band combination within the second band combination list corresponds to a position of said indicated band combination within the second band combination list.

43. The method of embodiment 41 or 42, comprising determining that no band combination from the first band combination list is allowed to be used by the second base station if the indexes of the first list of indexes are omitted from said signalling.

44. The method of embodiment 41, 42 or 43, comprising determining that no band combination from the second band combination list is allowed to be used by the second base station if the indexes of the second list of indexes are omitted from said signalling.

45. The method of one of embodiments 41 to 44, wherein the first base station and the second base station are acting in New Radio (NR) Evolved Universal Terrestrial Radio Access (E-UTRA) NR Dual Connectivity (NE-DC).

46. The method of embodiment 45,
    wherein the first band combination list comprises a list of band combinations supported by a wireless device for NE-DC and for E-UTRA NR Dual Connectivity (EN-DC); and
    wherein the second band combination list comprises a list of band combinations supported by the wireless device for NE-DC only.

47. The method of embodiment 45,
    wherein the first band combination list comprises a list of band combinations supported by a wireless device for NE-DC only; and wherein the second band combination list comprises a list of band combinations supported by the wireless device for NE-DC and for E-UTRA NR Dual Connectivity (EN-DC).

48. The method of any of embodiments 41 to 47, comprising selecting a band combination, and transmitting signalling to the first base station, wherein said signalling indicates the band combination selected by the second base station.

49. The method of embodiment 44, wherein said selected band combination is selected from among said indicated band combinations allowed to be used by the second base station.

50. The method of embodiment 44, wherein said selected band combination was not among said indicated band combinations allowed to be used by the second base station.

51. The method of any of embodiments 48 to 50, wherein said signalling transmitted to the first base station refers to any indicated band combination from the first band combination list by means of an index selected from a first list of indexes, identifying said indicated band combination within the first band combination list, and refers to any indicated band combination from the second band combination list by means of an index selected from a second list of indexes, identifying said indicated band combination within the second band combination list.

52. The method of embodiment 51, wherein said index identifying said indicated band combination within the first band combination list corresponds to a position of said indicated band combination within the first band combination list, and wherein said index identifying said indicated band combination within the second band combination list corresponds to a position of said indicated band combination within the second band combination list.

53. The method of any of the previous embodiments, further comprising:
obtaining user data; and
forwarding the user data to a host computer or a wireless device.

Group C Embodiments

54. A wireless device comprising:
processing circuitry configured to perform any of the steps of any of the Group A embodiments; and
power supply circuitry configured to supply power to the wireless device.

55. A base station comprising:
processing circuitry configured to perform any of the steps of any of the Group B embodiments;
power supply circuitry configured to supply power to the base station.

56. A user equipment (UE), comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;

an output interface connected to the processing circuitry and configured to output information from the UE that has been processed by the processing circuitry; and
a battery connected to the processing circuitry and configured to supply power to the UE.

57. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

58. The communication system of the previous embodiment further including the base station.

59. The communication system of the previous 2 embodiments, further including the UE, wherein the UE is configured to communicate with the base station.

60. The communication system of the previous 3 embodiments, wherein:
the processing circuitry of the host computer is configured to execute a host application, thereby providing the user data; and
the UE comprises processing circuitry configured to execute a client application associated with the host application.

61. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

62. The method of the previous embodiment, further comprising, at the base station, transmitting the user data.

63. The method of the previous 2 embodiments, wherein the user data is provided at the host computer by executing a host application, the method further comprising, at the UE, executing a client application associated with the host application.

64. A user equipment (UE) configured to communicate with a base station, the UE comprising a radio interface and processing circuitry configured to perform the method of the previous 3 embodiments.

65. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

66. The communication system of the previous embodiment, wherein the cellular network further includes a base station configured to communicate with the UE.

67. The communication system of the previous 2 embodiments, wherein:

the processing circuitry of the host computer is configured to execute a host application, thereby providing the user data; and the UE's processing circuitry is configured to execute a client application associated with the host application.

68. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

69. The method of the previous embodiment, further comprising at the UE, receiving the user data from the base station.

70. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

71. The communication system of the previous embodiment, further including the UE.

72. The communication system of the previous 2 embodiments, further including the base station, wherein the base station comprises a radio interface configured to communicate with the UE and a communication interface configured to forward to the host computer the user data carried by a transmission from the UE to the base station.

73. The communication system of the previous 3 embodiments, wherein:

the processing circuitry of the host computer is configured to execute a host application; and the UE's processing circuitry is configured to execute a client application associated with the host application, thereby providing the user data.

74. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

75. A method implemented in a communication system including a host computer, a base station and a user equipment (UE), the method comprising:

at the host computer, receiving user data transmitted to the base station from the UE, wherein the UE performs any of the steps of any of the Group A embodiments.

76. The method of the previous embodiment, further comprising, at the UE, providing the user data to the base station.

77. The method of the previous 2 embodiments, further comprising:

at the UE, executing a client application, thereby providing the user data to be transmitted; and at the host computer, executing a host application associated with the client application.

78. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

79. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

80. The communication system of the previous embodiment further including the base station.

81. The communication system of the previous 2 embodiments, further including the UE, wherein the UE is configured to communicate with the base station.

82. The communication system of the previous 3 embodiments, wherein:

the processing circuitry of the host computer is configured to execute a host application;

the UE is configured to execute a client application associated with the host application, thereby providing the user data to be received by the host computer.

83. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

84. The method of the previous embodiment, further comprising at the base station, receiving the user data from the UE.

85. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1× RTT CDMA2000 1× Radio Transmission Technology

3GPP 3rd Generation Partnership Project 5G 5th Generation

ABS Almost Blank Subframe

ARQ Automatic Repeat Request

AWGN Additive White Gaussian Noise

BCCH Broadcast Control Channel

BCH Broadcast Channel

CA Carrier Aggregation

CC Carrier Component

CCCH SDU Common Control Channel SDU

CDMA Code Division Multiplexing Access

CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a first base station, wherein the first base station is acting as a Master Node in Dual Connectivity, wherein a second base station is acting as a Secondary Node in Dual Connectivity, and, wherein the first base station and the second base station are acting in New Radio (NR) Evolved Universal Terrestrial Radio Access (E-UTRA) Dual Connectivity (NE-DC), wherein there exist a first band combination list and a second band combination list which are visible in the first and second base station, and wherein the first band combination list and the second band combination list each contain supported band combinations, wherein the first band combination list comprises a list of band combinations supported by a wireless device for NE-DC and for E-UTRA NR Dual Connectivity (EN-DC), and wherein the second band combination list comprises a list of band combinations supported by the wireless device for NE-DC only, the method comprising:

transmitting signaling to the second base station, the signaling being configured to indicate band combinations allowed to be used by the second base station, characterized in that the indicated band combinations comprise band combinations from the first band combination list and the second band combination list.

2. The method of claim 1, wherein the supported band combinations are reported to said first base station by a wireless device.

3. The method of claim 1, comprising referring in said signaling to any indicated band combination from the first band combination list by means of an index identifying said indicated band combination within the first band combination list.

4. The method of claim 3 wherein said index identifying said indicated band combination within the first band combination list corresponds to a position of said indicated band combination within the first band combination list.

5. The method of claim 3, comprising referring in said signaling to any indicated band combination from the second band combination list by means of an index corresponding to a sum of (a) an index identifying said indicated band combination within the second band combination list, and (b) a number of band combinations in the first band combination list.

6. The method of claim 5, wherein said index identifying said indicated band combination within the second band combination list corresponds to a position of said indicated band combination within the second band combination list.

7. The method of claim 1, comprising referring in said signaling to any indicated band combination from the first band combination list by means of an index selected from a first list of indexes identifying said indicated band combination within the first band combination list, and referring in said signaling to any indicated band combination from the second band combination list by means of an index selected from a second list of indexes identifying said indicated band combination within the second band combination list.

8. The method of claim 7, wherein said index identifying said indicated band combination within the first band combination list corresponds to a position of said indicated band combination within the first band combination list, and wherein said index identifying said indicated band combination within the second band combination list corresponds to a position of said indicated band combination within the second band combination list.

9. The method of claim 7, comprising indicating that no band combination from the first band combination list is allowed to be used by the second base station by omitting the indexes of the first list of indexes from said signaling.

10. The method of claim 7, comprising indicating that no band combination from the second band combination list is allowed to be used by the second base station by omitting the indexes of the second list of indexes in said signaling.

11. The method of claim 1, comprising receiving signaling from the second base station, wherein said received signaling indicates a band combination selected by the second base station from among said indicated band combinations allowed to be used by the second base station.

12. The method of claim 1, comprising receiving signaling from the second base station, wherein said received signaling indicates a band combination requested by the second base station that was not among said indicated band combinations allowed to be used by the second base station.

13. A method performed by a second base station, wherein a first base station is acting as a Master Node in Dual Connectivity, wherein the second base station is acting as a Secondary Node in Dual Connectivity, wherein the first base station and the second base station are acting in New Radio (NR) Evolved Universal Terrestrial Radio Access (E-UTRA) Dual Connectivity (NE-DC), wherein there exist a first band combination list and a second band combination list, which are visible in the first and second base station, and wherein the first band combination list and the second band combination list each contain supported band combinations, wherein the first band combination list comprises a list of band combinations supported by a wireless device for NE-DC and for E-UTRA NR Dual Connectivity (EN-DC), and wherein the second band combination list comprises a list of band combinations supported by the wireless device for NE-DC only, the method comprising:

receiving signaling from the first base station, the signaling being configured to indicate band combinations allowed to be used by the second base station, characterized in that the indicated band combinations comprise band combinations from the first band combination list and the second band combination list.

14. The method of claim 13, wherein said signaling refers to any indicated band combination from the first band combination list by means of an index identifying said indicated band combination within the first band combination list.

15. The method of claim 14, wherein said index identifying said indicated band combination within the first band combination list corresponds to a position of said indicated band combination within the first band combination list.

16. The method of claim 14, wherein said signaling refers to any indicated band combination from the second band combination list by means of an index corresponding to a sum of (a) an index identifying said indicated band combination within the second band combination list, and (b) a number of band combinations in the first band combination list.

17. The method of claim 16, wherein said index identifying said indicated band combination within the second band combination list corresponds to a position of said indicated band combination within the second band combination list.

18. The method of claim 13, wherein said signaling refers to any indicated band combination from the first band combination list by means of an index selected from a first list of indexes, identifying said indicated band combination within the first band combination list, and refers to any indicated band combination from the second band combination list by means of an index selected from a second list of indexes, identifying said indicated band combination within the second band combination list.

19. The method of claim 18, wherein said index identifying said indicated band combination within the first band combination list corresponds to a position of said indicated band combination within the first band combination list, and wherein said index identifying said indicated band combination within the second band combination list corresponds to a position of said indicated band combination within the second band combination list.

20. The method of claim 18, comprising determining that no band combination from the first band combination list is allowed to be used by the second base station if the indexes of the first list of indexes are omitted from said signaling.

21. The method of claim 20, comprising determining that no band combination from the second band combination list is allowed to be used by the second base station if the indexes of the second list of indexes are omitted from said signaling.

22. The method of claim 21, wherein said selected band combination is selected from among said indicated band combinations allowed to be used by the second base station.

23. The method of claim 21, wherein said selected band combination was not among said indicated band combinations allowed to be used by the second base station.

24. The method of claim 13, comprising selecting a band combination, and transmitting signaling to the first base station, wherein said signaling indicates the band combination selected by the second base station.

25. The method of claim 24, wherein said signaling transmitted to the first base station refers to any indicated band combination from the first band combination list by means of an index identifying said indicated band combination within the first band combination list.

26. The method of claim 25 wherein said index identifying said indicated band combination within the first band combination list corresponds to a position of said indicated band combination within the first band combination list.

27. The method of claim 24, wherein said signaling transmitted to the first base station refers to any indicated band combination from the second band combination list by means of an index corresponding to a sum of (a) an index identifying said indicated band combination within the second band combination list, and (b) a number of band combinations in the first band combination list.

28. The method of claim 27, wherein said index identifying said indicated band combination within the second band combination list corresponds to a position of said indicated band combination within the second band combination list.

29. The method of claim 24, wherein said signaling transmitted to the first base station refers to any indicated band combination from the first band combination list by means of an index selected from a first list of indexes identifying said indicated band combination within the first band combination list, and refers to any indicated band combination from the second band combination list by means of an index selected from a second list of indexes identifying said indicated band combination within the second band combination list.

30. The method of claim 29, wherein said index identifying said indicated band combination within the first band combination list corresponds to a position of said indicated band combination within the first band combination list, and wherein said index identifying said indicated band combination within the second band combination list corresponds to a position of said indicated band combination within the second band combination list.

31. A first base station acting as a Master Node in Dual Connectivity, wherein a second base station is acting as a Secondary Node in Dual Connectivity, wherein the first base station and the second base station are acting in New Radio (NR) Evolved Universal Terrestrial Radio Access (E-UTRA) Dual Connectivity (NE-DC), and wherein there exists a first band combination list and a second band combination list which are visible in the first and second base station, and wherein the first band combination list and the second band combination list each contain supported band combinations, wherein the first band combination list comprises a list of band combinations supported by a wireless device for NE-DC and for E-UTRA NR Dual Connectivity (EN-DC), and wherein the second band combination list comprises a list of band combinations supported by the wireless device for NE-DC only, the first base station comprising radio circuitry configured to communicate with one or more wireless devices;

interface circuitry configured to communicate with one or more other base stations; and processing circuitry configured to cause the first base station to:

signal to the second base station to indicate band combinations allowed to be used by the second base station, wherein the second base station is acting as a Secondary Node in Dual Connectivity, wherein the indicated band combinations comprise band combinations from the first band combination list and the second band combination list.

32. A second base station acting as a Secondary Node in Dual Connectivity, wherein a first base station is acting as a Master Node in Dual Connectivity, wherein the first base station and the second base station are acting in New Radio (NR) Evolved Universal Terrestrial Radio Access (E-UTRA) Dual Connectivity (NE-DC), and wherein there exists a first band combination list and a second band combination list which are visible in the first and second base station, and wherein the first band combination list and the second band combination list each contain supported band combinations, wherein the first band combination list comprises a list of band combinations supported by a wireless device for NE-DC and for E-UTRA NR Dual Connectivity (EN-DC), and wherein the second band combination list comprises a list of band combinations supported by the wireless device for NE-DC only, the second base station comprising radio circuitry configured to communicate with one or more wireless devices;

interface circuitry configured to communicate with one or more other base stations; and processing circuitry configured to cause the second base station to:

receive signaling from the first base station to indicate band combinations allowed to be used by the second base station, characterized in that the indicated band combinations comprise band combinations from the first band combination list and the second band combination list.

* * * * *